（12） United States Patent
Takizawa

(10) Patent No.: US 8,297,389 B2
(45) Date of Patent: Oct. 30, 2012

(54) LOAD DRIVING SYSTEM AND ELECTRIC VEHICLE USING THE SYSTEM

(75) Inventor: Satoki Takizawa, Hino (JP)

(73) Assignee: Fuji Electric Co., Ltd., Kawasaki-shi (JP)

( * ) Notice: Subject to any disclaimer, the term of this patent is extended or adjusted under 35 U.S.C. 154(b) by 312 days.

(21) Appl. No.: 12/838,414

(22) Filed: Jul. 16, 2010

(65) Prior Publication Data

US 2011/0011658 A1   Jan. 20, 2011

(30) Foreign Application Priority Data

Jul. 17, 2009  (JP) ................................. 2009-168836

(51) Int. Cl.
  *B60K 1/00*  (2006.01)
(52) U.S. Cl. .................. 180/65.265; 318/139; 318/109; 318/400.3; 323/222; 323/267; 363/65
(58) Field of Classification Search ................ 180/54.1, 180/65.1, 65.265, 65.29, 65.31; 318/109, 318/139, 400.3, 727, 801, 802, 812; 323/222, 323/267; 363/65
See application file for complete search history.

(56) References Cited

U.S. PATENT DOCUMENTS

| 4,823,247 | A | * | 4/1989 | Tamoto | ........................... | 363/16 |
| 5,926,012 | A | * | 7/1999 | Takizawa et al. | ............. | 323/284 |
| 6,288,595 | B1 | * | 9/2001 | Hirakata et al. | ............. | 327/424 |
| 6,864,663 | B2 | * | 3/2005 | Komiyama et al. | ............ | 320/104 |
| 6,922,106 | B2 | * | 7/2005 | Lautzenhiser et al. | ........ | 330/295 |
| 7,455,134 | B2 | * | 11/2008 | Severinsky et al. | ........ | 180/65.28 |
| 2009/0015071 | A1 | * | 1/2009 | Iwata et al. | ...................... | 307/77 |
| 2010/0039843 | A1 | * | 2/2010 | Takizawa | ..................... | 363/131 |
| 2011/0011658 | A1 | * | 1/2011 | Takizawa | ..................... | 180/65.31 |
| 2011/0242860 | A1 | * | 10/2011 | Takizawa et al. | ............... | 363/62 |
| 2011/0242866 | A1 | * | 10/2011 | Takizawa | ..................... | 363/131 |
| 2012/0018777 | A1 | * | 1/2012 | Takizawa | ..................... | 257/140 |

FOREIGN PATENT DOCUMENTS

JP    2001-275367 A    10/2001
JP    2004-015895 A    1/2004

OTHER PUBLICATIONS

Hideto Hanada et al., "Motor Control and Boost Converter Control for Hybrid Vehicles", Toyota Technical Review, vol. 54, No. 1, Aug. 2005.

* cited by examiner

*Primary Examiner* — John Walters
*Assistant Examiner* — James Triggs
(74) *Attorney, Agent, or Firm* — Rabin & Berdo, P.C.

(57) ABSTRACT

A motor driving system with a pair of units connected in series to form a DC power supply with an intermediate potential connection point, positive and negative electrode lines connected to the positive and negative sides of the power supply through positive and negative electrode side switching circuits, an intermediate potential line with one end connected to the intermediate potential point, a DC to DC converter unit having two switching devices connected in series between the positive and negative electrode lines, a DC link circuit connected in parallel to the DC to DC converter unit between the positive and negative electrode lines, and a DC to AC converter unit driving an AC motor, the other end of the intermediate potential line connected to the connection point between the switching devices with a reactor in the intermediate potential line or in each of the positive and negative electrode lines.

8 Claims, 18 Drawing Sheets

FIG. 2A
FIG. 2B
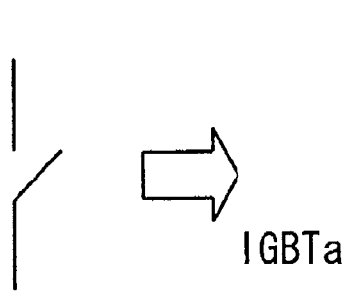
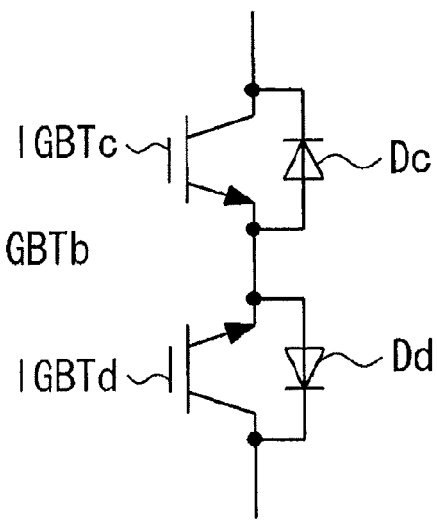

LOAD DRIVING SYSTEM AND ELECTRIC VEHICLE USING THE SYSTEM

FIELD OF THE INVENTION

The present invention relates to a load driving system, which can be applied, to a device such as an electric vehicle, for example, that drives a motor by electric power supplied from at least a battery, and to an electric vehicle using the system.

BACKGROUND ART

A known example of a load driving system for an electric vehicle is a motor driving system that includes a battery generating a specified DC voltage, a bilateral step-up chopper unit raising the DC voltage generated by the battery to become a power supply for driving a motor on the basis of the raised voltage, an inverter unit for driving the motor, and an electrolytic capacitor connected between the bilateral step-up chopper and the inverter unit for smoothing the DC voltage outputted from the bilateral step-up chopper unit (see JP-A-2001-275367, for example).

Moreover, a variable voltage system is known which raises a battery voltage using a step-up converter to supply the raised voltage to a main capacitor, and variably controls a system voltage outputted from the step-up converter according to the operating condition of the motor (see Hideto Hanada et al., "Motor Control and Boost Converter Control for Hybrid Vehicles," TOYOTA Technical Review, Vol. 54, No. 1, August 2005, pp. 42-51 (in Japanese), for example). More specifically, in a motor system, system losses such as a motor loss (a copper loss+a core loss), an inverter loss (an on-loss+a switching loss), a step-up IGBT loss (an on-loss+a switching loss) and a step-up reactor loss (a copper loss+a core loss) are produced. A condition to minimize the system losses is to make the system voltage approximately equal to an induced voltage of the motor. Since the induced voltage varies depending on the operating conditions of the motor (a rotating speed and a torque), a variable control of the system voltage according to the operating condition of the motor can minimize the losses.

FIG. 15 is a block diagram showing the circuit configuration of the motor driving system described in the above JP-A-2001-275367 as an example of the circuit configuration of a related motor driving system. As shown in FIG. 15, the system has a configuration in which a bilateral step-up chopper unit 101, formed with a DC to DC converter circuit, is provided for raising a battery voltage Vb of a battery 100, a DC link circuit 102, including an electrolytic capacitor connected between a positive electrode side line Lp and a negative electrode side line Ln, is connected onto the output side of the bilateral step-up chopper unit 101, and an inverter unit 103 as a DC to AC converter circuit is further connected in parallel to the electrolytic capacitor in the DC link circuit 102. The inverter unit 103 supplies three-phase AC power outputted therefrom to a motor 104.

Here, the bilateral step-up chopper unit 101 is formed of an IGBT1 and an IGBT2 connected in series between the positive electrode side line Lp and the negative electrode side line Ln, and a reactor L inserted between the connection point of the IGBT1 and the IGBT2 and the positive electrode side of the battery 100. Moreover, the battery 100 forms a DC power supply of a high voltage by connecting several tens of units, each with several volts, in series.

In general, the rotating speed Nm of the motor 104 and the DC voltage Ed across the electrolytic capacitor in the DC link circuit 102 are controlled to have a relation as is shown in FIG. 16. Namely, with the DC voltage Ed made equal to the battery voltage Vb while the rotating speed of the motor 104 is between zero and a specified rotating speed $N_0$, switching devices forming the inverter unit 103 are subjected to PWM control, by which the rotating speed of the motor 104 is controlled. Then, while the rotating speed of the motor 104 exceeds the specified rotating speed $N_0$ to reach a specified rotating speed $N_1$ larger than the specified rotating speed $N_0$, the step-up rate of the battery voltage Vb is made gradually increased from 1 according to an increase in the rotating speed of the motor 104 by the bilateral step-up chopper unit 101. This, with the DC voltage Ed made gradually increased from the battery voltage Vb, makes switching devices in the inverter unit 103 subjected to PWM control, by which the rotating speed of the motor 104 is controlled.

Thereafter, with the rotating speed of the motor 104 exceeding the specified rotating speed $N_1$ at which the DC voltage Ed reaches the maximum voltage $Ed_{MAX}$, the DC voltage Ed is made fixed at the maximum voltage $Ed_{MAX}$ and, for a further increase in the rotating speed of the motor 104, the inverter unit 103 is made to shift its control from the PWM control to one-pulse control or made to carry out field weakening control.

However, in the above examples of related load driving systems, the minimum DC input voltage inputted to the inverter unit 103 to be the DC to AC converter circuit becomes the battery voltage Vb. From this, when the motor 104 is operated at a low speed, the PWM control is to be carried out in the inverter unit 103 with the battery voltage Vb.

This causes the switching losses of the switching devices (IGBTs and diodes) to become large and, along with this, also on the side of the motor 104, causes ripples in a flowing current to become large. Thus, there is an unsolved problem in that harmonic losses due to carrier frequency components are increased to cause reductions in efficiencies of the load driving system and the motor.

Moreover, when the motor 104 is operated at a high speed, the battery voltage Vb is raised by the bilateral step-up chopper unit 101 as a DC to DC converter circuit. At this time, in the case of the circuit shown in FIG. 16, the IGBT1 and the IGBT2 are operated together with the diodes D1 and D2. Thus, there is also an unsolved problem in that these semiconductor chips are required to have corresponding capacities.

Furthermore, an electric vehicle normally has a battery mounted in which tens of units of batteries each having an output voltage of several volts are connected in series to be provided as a battery with an output voltage of hundreds of volts. However, when only any one unit causes failure for some reason, the battery units connected in series causes the whole of the battery 100 to become unusable. Therefore, in a battery system with battery units simply connected in series as shown in FIG. 15, there is also an unsolved problem in that the reliability of the system can not be improved.

Accordingly, the invention was made by giving attention to the unsolved problems in the above example of a related system with an object of providing a load driving system which can ensure a normal operation of a motor even in the event a failure occurs in a part of a battery while making the load driving system and the motor highly efficient and providing an electric vehicle using the system.

SUMMARY OF THE INVENTION

For achieving the object, a load driving system according to a first form of the invention is a load driving system driving an AC motor with the use of a DC power supply, which system includes: a pair of DC power supply units being connected in series to form the DC power supply with the connection point provided as an intermediate potential point; a positive electrode side line with one end thereof connected to the positive electrode side of the DC power supply through a positive electrode side switching circuit; a negative electrode side line with one end thereof connected to the negative electrode side of the DC power supply through a negative electrode side switching circuit; an intermediate potential line with one end thereof connected to the intermediate potential point of the DC power supply; a DC to DC converter unit having at least two switching devices connected in series between the positive electrode side line and the negative electrode side line; a DC link circuit having a DC link capacitor being connected in parallel to the DC to DC converter unit between the positive electrode side line and the negative electrode side line; and a DC to AC converter unit connected to the other end of the positive electrode side line and the other end of the negative electrode side line in parallel to the DC link capacitor in the DC link circuit for converting DC power in the DC link circuit to AC power to supply the AC power to the AC motor. The DC to DC converter unit has one of a configuration in which the other end of the intermediate potential line is connected to the connection point between the switching devices with a reactor inserted in the intermediate potential line and a configuration in which the other end of the intermediate potential line is connected to the connection point between the switching devices with a reactor inserted in each of the positive electrode side line and the negative electrode side line.

A second form of the invention is that, in the load driving system according to the first form of the invention, one of the positive electrode side switching circuit and the negative electrode side switching circuit is controlled to be in a normally turned-off state and the other one is controlled to be in a normally turned-on state to form a low power supplying unit for supplying a voltage of one-half of the voltage of the DC power supply to the DC link circuit. Moreover, a third form of the invention is that, in the load driving system according to the first form of the invention, both of the positive electrode side switching circuit and the negative electrode side switching circuit are controlled to be in normally turned-on states to form an intermediate power supplying unit for supplying the voltage of the DC power supply to the DC link circuit.

A fourth form of the invention is that, in the load driving system according to the first form of the invention, one of the positive electrode side switching circuit and the negative electrode side switching circuit is controlled to be in a normally turned-off state, the other one is controlled to be in a turned-on state and the switching devices in the DC to DC converter unit are subjected to on-off control to form a high power supplying unit for supplying a voltage, to which a voltage of one-half of the voltage of the DC power supply is raised by the reactor, to the DC link circuit. In addition, a fifth form of the invention is that, in the load driving system according to the second or the fourth form of the invention, a first control mode, in which the positive electrode side switching circuit is controlled to be in a turned-on state and the negative electrode side switching circuit is controlled to be in a turned-off state, and a second control mode, in which the positive electrode side switching circuit is controlled to be in a turned-off state and the negative electrode side switching circuit is controlled to be in a turned-on state, are made to be alternately repeated in time sequence.

A sixth form of the invention is that, in the load driving system according to the first form of the invention, when one of a pair of the DC power supply units becomes abnormal, one of the positive electrode side switching circuit and the negative electrode side switching circuit that is connected to the abnormal DC power supply unit is controlled to be in a normally turned-off state and the other switching circuit that is connected to the normal DC power supply unit is controlled to be in a normally turned-on state and, along with this, a switching device in the DC to DC converter unit, which device is connected to the normal DC power supply unit through the switching circuit controlled to be in the normally turned-on state, is subjected to on-off control to supply DC power to the DC link circuit.

An electric vehicle according to a seventh form of the invention is provided with a load driving system according to any one of the first to the sixth forms as a motor driving system for driving the driving wheels of a vehicle.

According to the invention, there can be obtained advantages that high efficiency operations of a load driving system and a motor become possible and, along with this, a normal operation of a motor can be ensured even in the event a failure occurs in a part of the DC power supply. Moreover, by applying the load driving system having the above advantages to a motor driving system of an electric vehicle, an electric vehicle with a high reliability can be provided.

BRIEF DESCRIPTION OF THE DRAWINGS

FIG. 2 is a circuit diagram showing examples of configurations of switching circuits that can be applied to the above embodiment of the load driving system according to the invention;

DESCRIPTION OF THE PREFERRED EMBODIMENT

Figure 1:
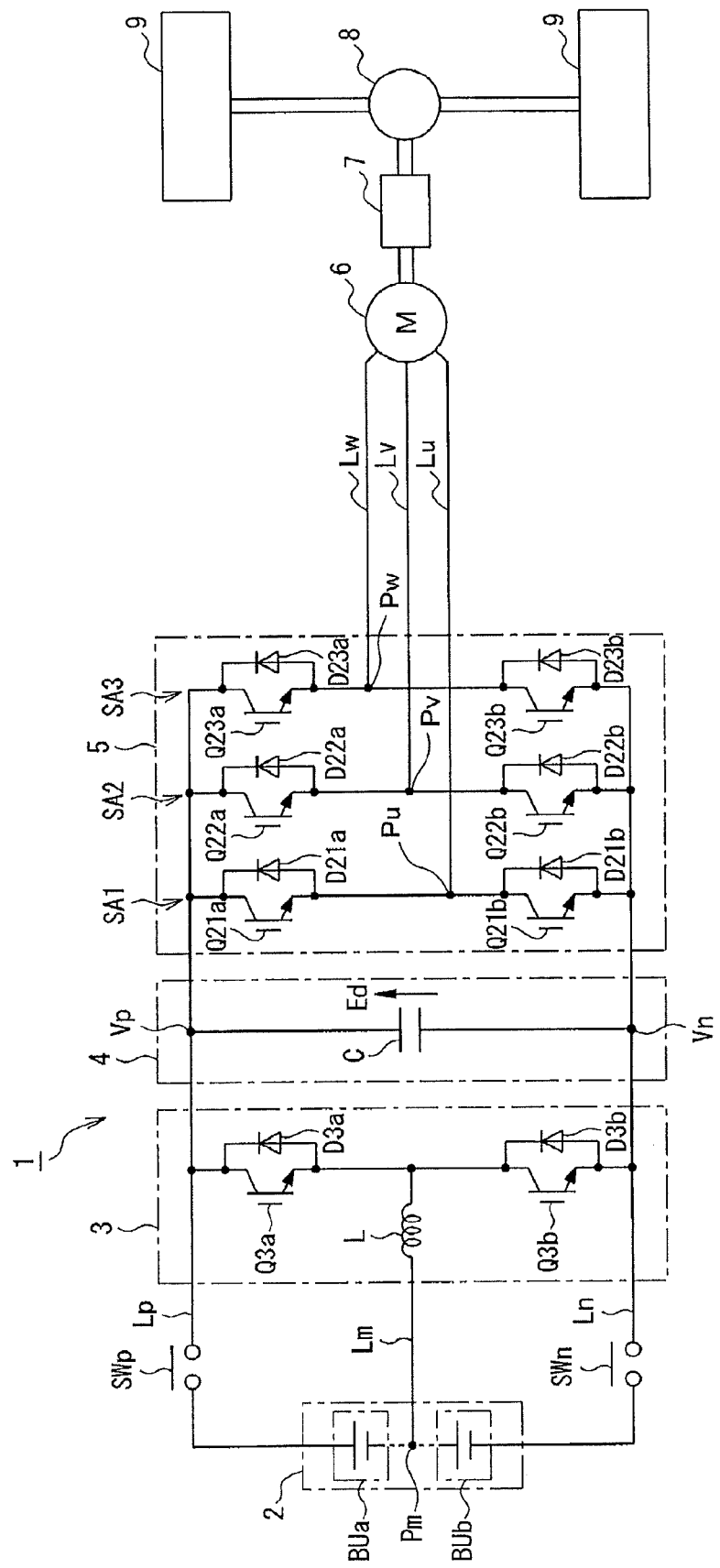
FIG. 1 is a block diagram showing a circuit configuration of an embodiment of a load driving system according to which the invention is applied to an electric vehicle.

In the following, an embodiment of the invention will be explained on the basis of the attached drawings. FIG. 1 is a block diagram showing a circuit configuration of an embodiment of a load driving system according to which the invention is applied to an electric vehicle and FIG. 2 is a circuit diagram showing examples of configurations of switching circuits that can be applied to the embodiment of the system according to the invention. In FIG. 1, reference numeral 1 denotes a motor driving system as a load driving system applied to an electric vehicle. The motor driving system 1 is provided with a DC power supply 2 formed of batteries, a DC to DC converter unit 3 connected in parallel to the DC power supply 2 with a positive electrode side line Lp and an negative electrode side line Ln derived from the positive electrode side and the negative electrode side, respectively, of the DC power supply 2, a DC link circuit 4 and a DC to AC converter unit 5. Moreover, AC power outputted from the DC to AC converter unit 5 is supplied to an AC motor 6. The AC motor 6 produces a driving torque, which is transmitted to driving wheels 9 through a reduction gear mechanism 7 as necessary, and further, through a differential gear 8.

The DC power supply 2 is formed by connecting tens of batteries, each having an output voltage of several volts, in series so that a battery voltage Vb of hundreds of volts is obtained. The series connected batteries are divided into two units to form battery units BUa and BUb. From the positive electrode side of the battery unit BUa, the positive electrode side line Lp is derived through a positive electrode side switching circuit SWp and, from the negative electrode side of the battery unit BUb, the negative electrode side line Ln is derived through a negative electrode side switching circuit SWn. Furthermore, from a connection point of the battery units BUa and BUb, i.e. an intermediate potential point Pm, an intermediate potential line Lm is derived. Here, each of the positive electrode side switching circuit SWp and the negative electrode side switching circuit SWn can be formed with a mechanical switch such as a contactor or with an assembly having semiconductor switching devices with reverse-blocking characteristics such as thyristors or insulated gate bipolar transistors (IGBTs) connected in inverse-parallel. For example, it is preferable to apply a configuration in which IGBTS IGBTa and IGBTb each having a reverse-blocking characteristic are connected in inverse-parallel as shown in (a) of FIG. 2, or to apply a configuration in which IGBTs IGBTc and IGBTd each having no reverse-blocking characteristic are connected in series, with a diode Dc and a diode Dd connected in inverse parallel to the IGBTc and the IGBTd, respectively, as shown in (b) of FIG. 2.

Moreover, the DC to DC converter unit 3 has a configuration of a bilateral step-up chopper circuit and is provided with switching devices Q3a and Q3b formed of a pair of, for example, IGBTs connected in series between the positive electrode side line Lp and the negative electrode side line Ln. To the connection point of the switching devices Q3a and Q3b, the intermediate potential line Lm of the DC power supply 2 is connected through a reactor L. To the switching devices Q3a and Q3b, diodes D3a and D3b are connected, respectively, in inverse parallel.

Furthermore, the DC link circuit 4 is provided with a DC link capacitor C connected between the positive electrode side line Lp and the negative electrode side line Ln. By the DC link capacitor C, the DC power outputted from the DC to DC converter unit 3 is smoothed. A DC voltage Ed across the DC link capacitor C is supplied to the DC to AC converter unit 5.

In addition, the DC to AC converter unit 5 has a configuration of an inverter circuit, which has three switching arms SA1 to SA3 connected in parallel to one another between the positive electrode side line Lp and the negative electrode side line Ln. The switching arms SA1 to SA3 have their respective pairs of switching devices Qja and Qjb (j=21 to 23) each being implemented as, for example, an IGBT (Insulated Gate Bipolar Transistor). The switching devices Qja and Qjb in each of the pairs are connected in series between the positive electrode side line Lp and the negative electrode side line Ln. Moreover, the switching devices Qja to Qjb have diodes Dja and Djb, respectively, connected in inverse-parallel thereto. Furthermore, connection points of the paired switching devices Qja and Qjb are made to serve as AC output points Pu, Pv and Pw, which are connected to connection lines Lu, Lv and Lw, respectively, connected to, for example, star-connected coils in the AC motor 6 as a load.

Figure 3:
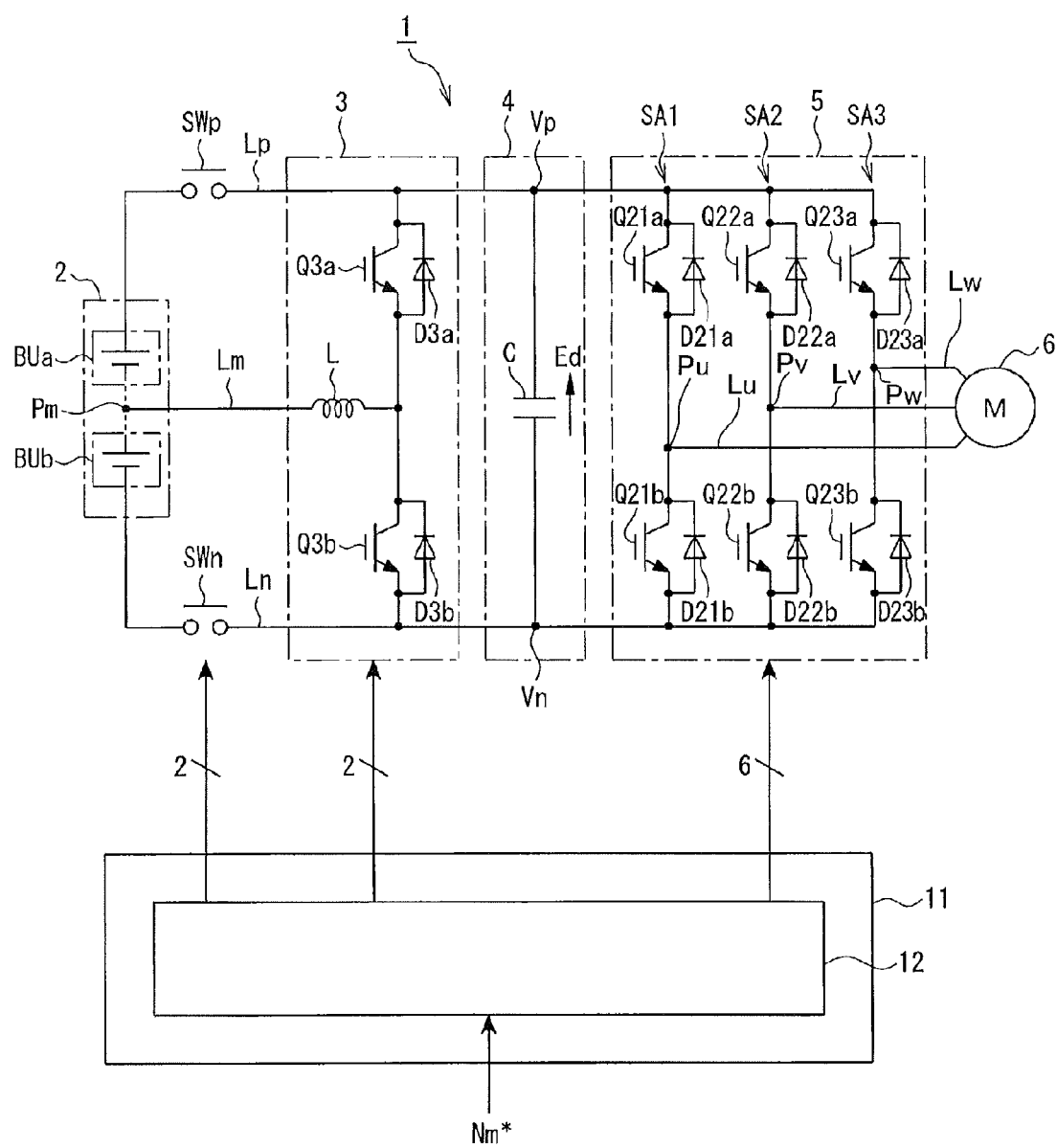
FIG. 3 is a block diagram showing the embodiment of the load driving system according to the invention with a control system included.

FIG. 3 is a block diagram showing the embodiment of the load driving system according to the invention with a control system included. On-off controls of the positive electrode side switching circuit SWp and the negative electrode side switching circuit SWn and PWM (Pulse Width Modulation) controls of the switching devices Q3a and Q3b in the DC to DC converter unit 3 and the switching devices Q21a to Q23b in the DC to AC converter unit 5 are carried out by a control unit 12 in a control system 11 shown in FIG. 3. Here, to the control unit 12, a rotating speed instruction (or a frequency instruction) value Nm* for the AC motor 6 is inputted.

Figure 4:
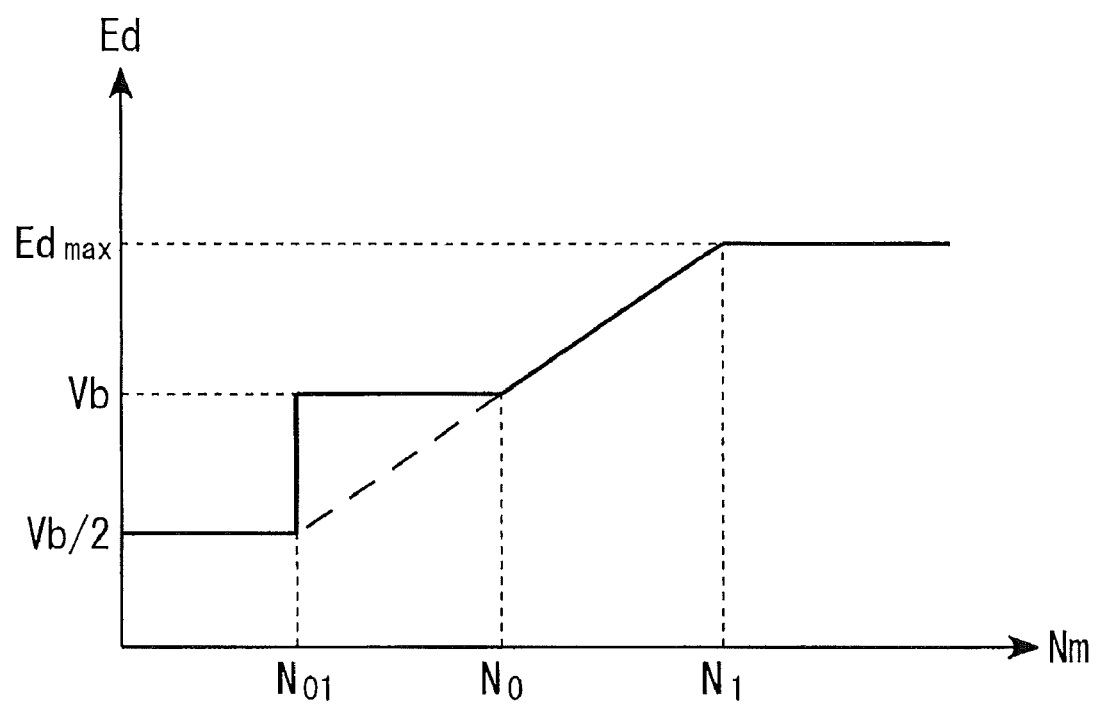
FIG. 4 is a characteristic curve diagram showing a relation between the rotating speed of the motor and the DC voltage across the capacitor of the DC link circuit in the embodiment of the load driving system according to the invention.
Figure 5A:
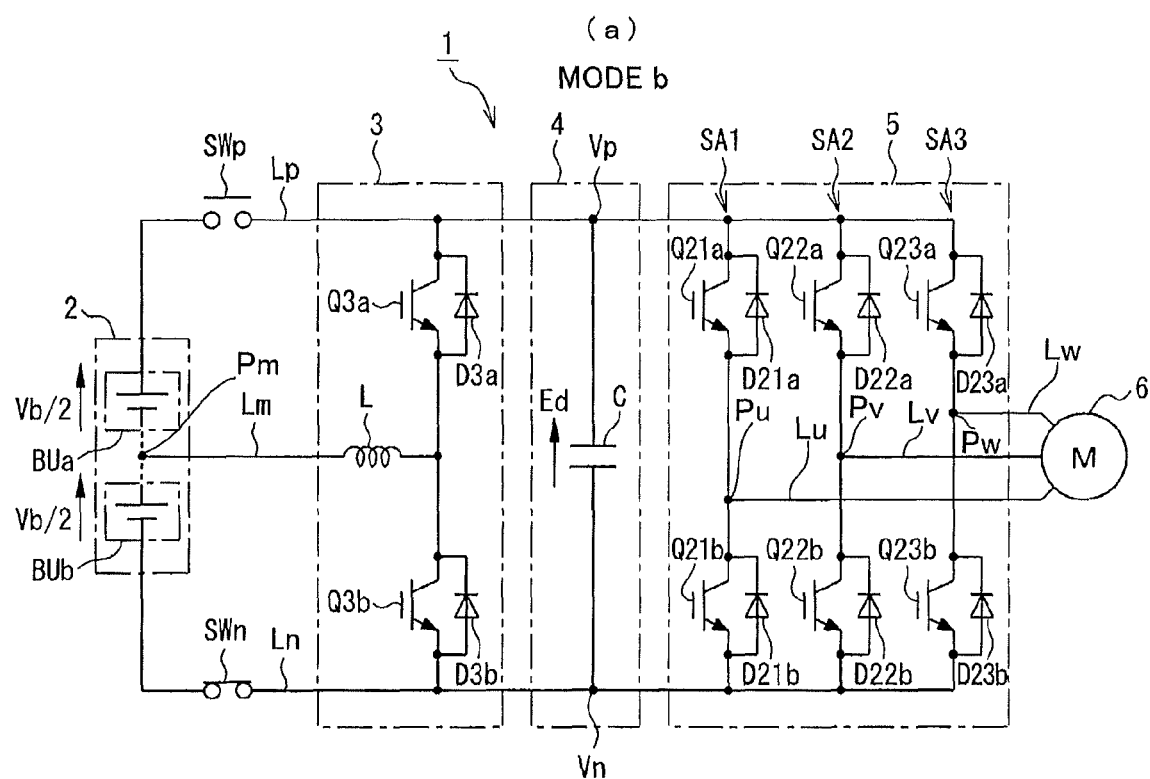
FIG. 5 is a block diagram illustrating states of operations when the motor is driven in a low speed rotating region in the embodiment of the load driving system according to the invention.
Figure 5B:
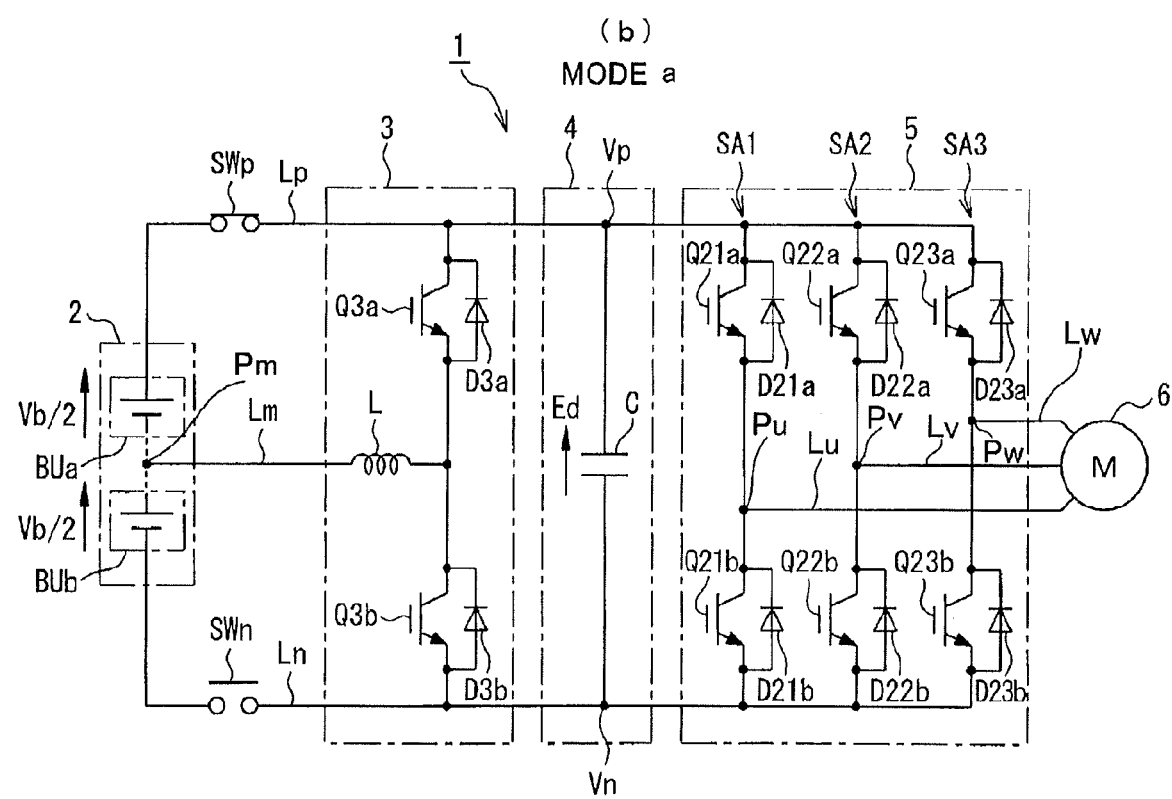

Next, an operation of the preferred embodiment will be explained. FIG. 4 is a characteristic curve diagram showing a relation between the rotating speed Nm of the motor and the DC voltage Ed across the capacitor C in the DC link circuit 4 in the embodiment of the load driving system according to the invention, and FIG. 5 is a block diagram illustrating states of operations when the AC motor 6 is driven in a low speed rotating region in the embodiment of the load driving system according to the invention. Now, a vehicle runs at a low speed (for example, on the order of 0 to 20 km/h) with the extent of running in traffic congestion and the AC motor 6 is driven to rotate at a low speed with the rotating speed Nm of the AC motor 6 set at the specified rotating speed $N_{01}$ or less as shown in FIG. 4. In this case, as shown in (a) of FIG. 5, with the positive electrode side switching circuit SWp being made normally turned-off and the negative electrode side switching circuit SWn being made normally turned-on, for example, the battery unit BUb is chosen. Under thus controlled condition, the positive electrode side of the battery unit BUb is connected to the positive electrode side of the DC link capacitor C in the DC link circuit 4 through the reactor L and the diode D3a connected in inverse-parallel to the switching device Q3a. Moreover, the negative electrode side of the battery unit BUb is connected to the negative electrode side of the DC link capacitor C in the DC link circuit 4 through the negative electrode side switching circuit SWn and the negative electrode side line Ln. In this case, the voltage of the battery unit BUb is Vb/2, one-half of the battery voltage Vb. Thus, with the voltage Vb/2, the DC link capacitor C is to be charged. Therefore, the DC voltage Ed between a positive electrode side potential part Vp and a negative electrode side potential part Vn at the respective ends of the DC link capacitor C becomes Vb/2.

The DC voltage Ed (=Vb/2) across the DC link capacitor C in the DC link circuit 4 is supplied to the switching arms SA1 to SA3 in the DC to AC converter unit 5. Hence, by carrying out PWM controls of the switching devices Q21a to Q23a and Q21b to Q23b in the switching arms SA1 to SA3 by the control unit 12 shown in FIG. 4 with a duty ratio based on the rotating speed instruction (or frequency instruction) value $Nm^*$, the AC motor can be driven to rotate at a low speed. Thus, the AC motor 6 is driven with a voltage Vb/2 of one-half of the battery voltage Vb supplied to the DC to AC converter unit 5 and the switching devices Q21a to Q23a and Q21b to Q23b in the DC to AC converter unit 5 subjected to PWM control. Therefore, reduction of switching losses in the DC to AC converter unit 5 and a higher harmonic loss of the AC motor becomes possible.

Similarly, as shown in (b) of FIG. 5, with the positive electrode side switching circuit SWp being made normally turned-on and the negative electrode side switching circuit SWn being made normally turned-off, the battery unit BUa is chosen. Thus, the positive electrode side of the battery unit BUa is connected to the positive electrode side of the DC link capacitor C in the DC link circuit 4 through the positive electrode side switching circuit SWp and the positive electrode side line Lp. While, the negative electrode side of the battery unit BUa is connected to the negative electrode side of the DC link capacitor C through the reactor L, the diode D3b and further the negative electrode side line Ln. This, like the above explained state shown in (a) of FIG. 5, makes the DC voltage Ed across the DC link capacitor C become Vb/2, one-half of the battery voltage Vb. The voltage Ed (=Vb/2) is supplied to the DC to AC converter unit 5. Moreover, like the above explained state shown in (a) of FIG. 5, by carrying out a PWM control of the switching devices Q21a to Q23b and Q21b to Q23b in the DC to AC converter unit 5, reduction of switching losses in the DC to AC converter unit 5 and a higher harmonic loss of the AC motor becomes possible.

In addition, for reducing a load so as not to concentrate on one battery unit BUa (or BUb) in a low speed rotating region of the AC motor 6, the mode "a" of using the battery unit BUa as shown in (b) of FIG. 5 and a mode "b" of using the battery unit BUb as shown in (a) of FIG. 5 can be alternately changed in time sequence in the low speed rotating region.

Next, an explanation will be made about the case in which a vehicle runs, for example, at an intermediate speed (on the order of 20 km/h to 70 km/h) with the extent of running in a city and the AC motor 6 is driven to rotate in an intermediate speed rotating region with the rotating speed Nm of the AC motor 6 exceeding the specified rotating speed $N_{01}$ and becoming not more than $N_0$ larger than the specified rotating speed $N_{01}$ shown in FIG. 4.

Figure 6:
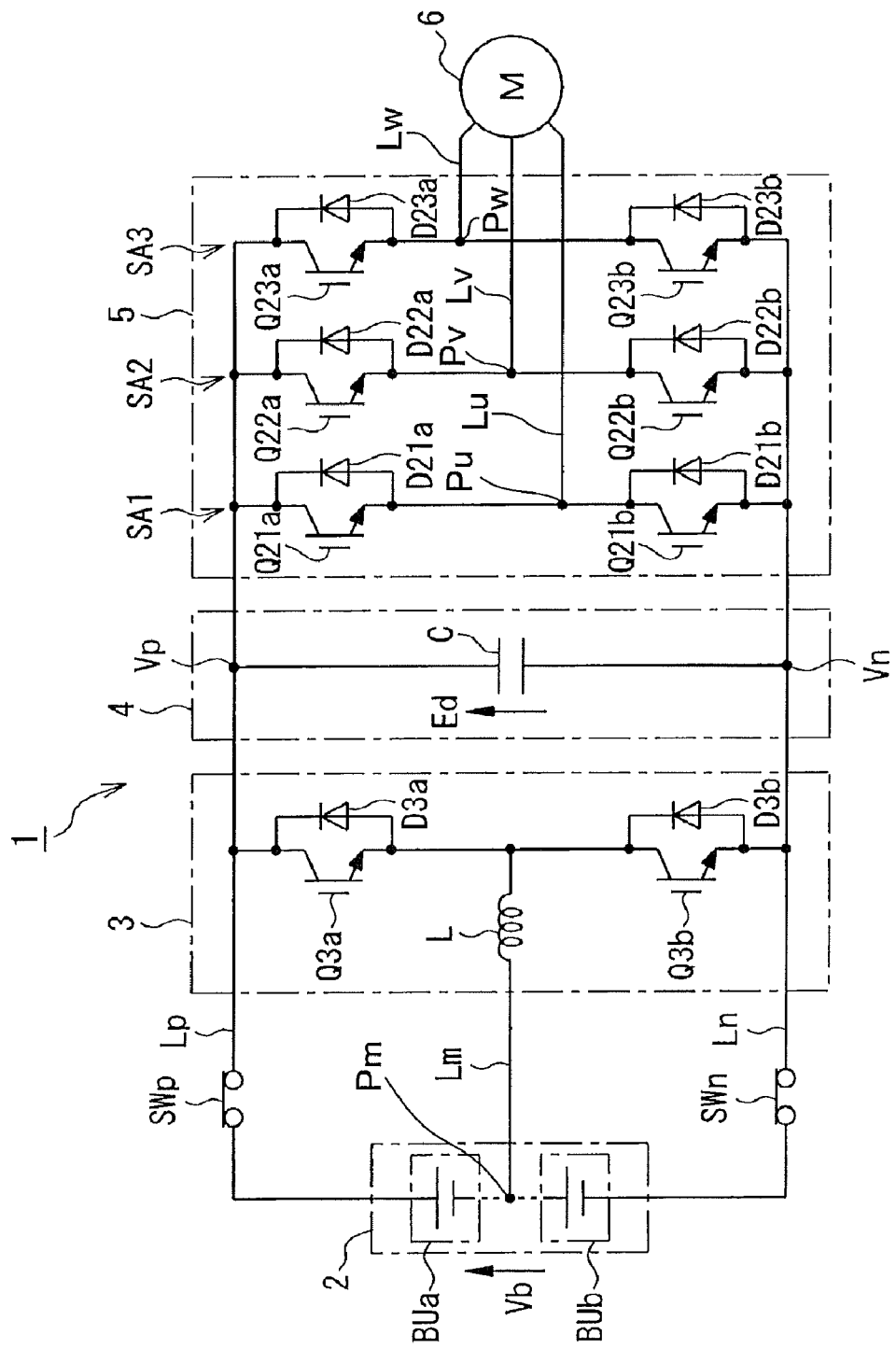
FIG. 6 is a block diagram illustrating a state of operation when the motor is driven in an intermediate speed rotating region in the embodiment of the load driving system according to the invention.

FIG. 6 is a block diagram illustrating a state of operation when the AC motor 6 is driven in an intermediate speed rotating region. In the intermediate speed rotating region, as shown in FIG. 6, with both of the positive electrode side switching circuit SWp and the negative electrode side switching circuit SWn controlled to be in normally turned-on states, the battery units BUa and BUb are chosen. In the controlled state, with a battery voltage Vb, to which the voltages of the batteries BUa and BUb are added, the DC link capacitor C in the DC link circuit 4 is charged. Thus, the DC voltage Ed across the DC link capacitor C becomes the battery voltage Vb, by which a voltage two times the voltage in the above explained low speed rotation driving state is supplied to the DC to AC converter unit 5. Hence, by carrying out PWM control of the switching devices Q21a to Q23a and Q21b to Q23b in the DC to AC converter unit 5, the AC motor 6 can be driven to rotate by a high voltage.

Figure 15:
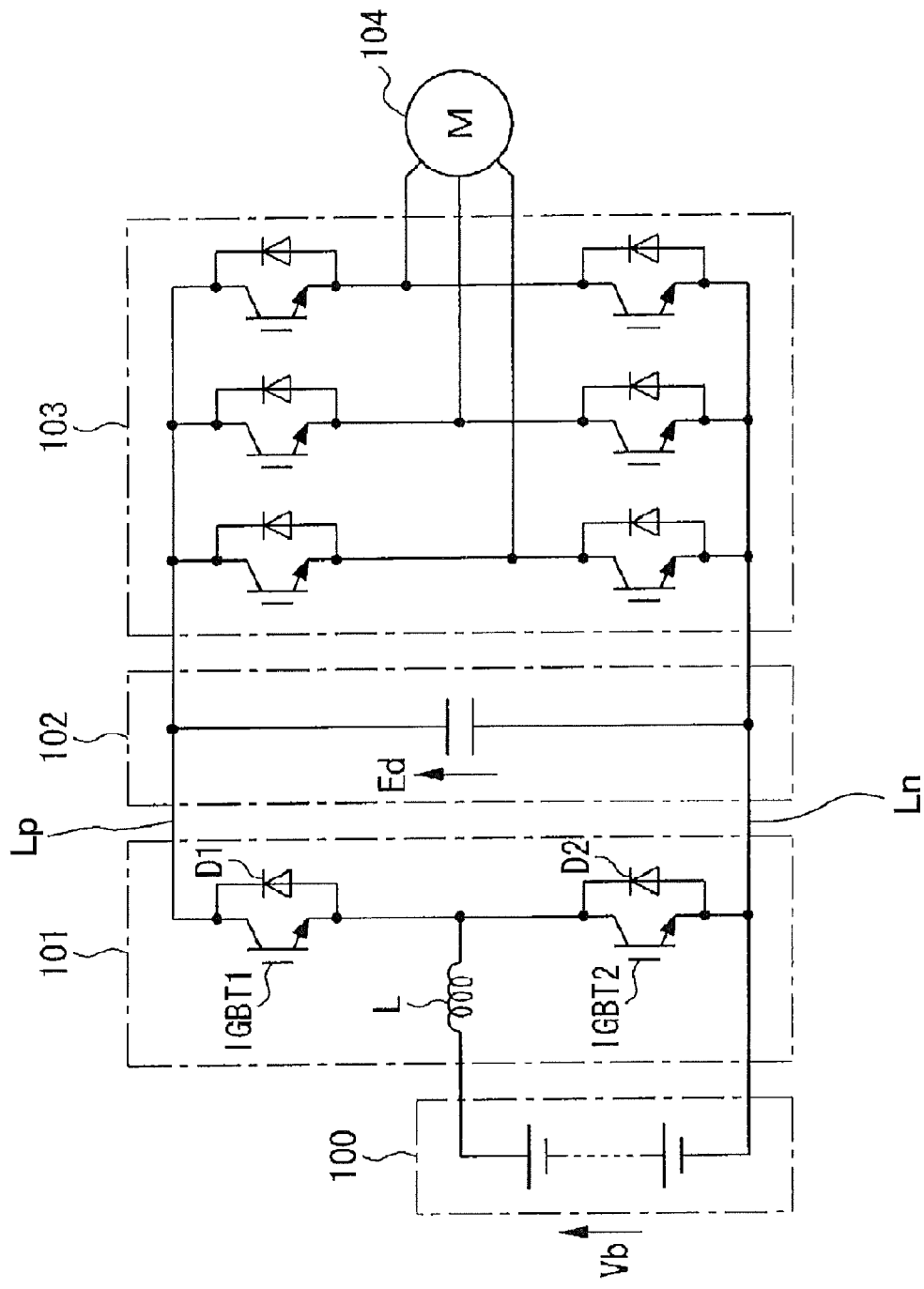
FIG. 15 is a block diagram showing an example of the circuit configuration of a related motor driving system.
Figure 16:
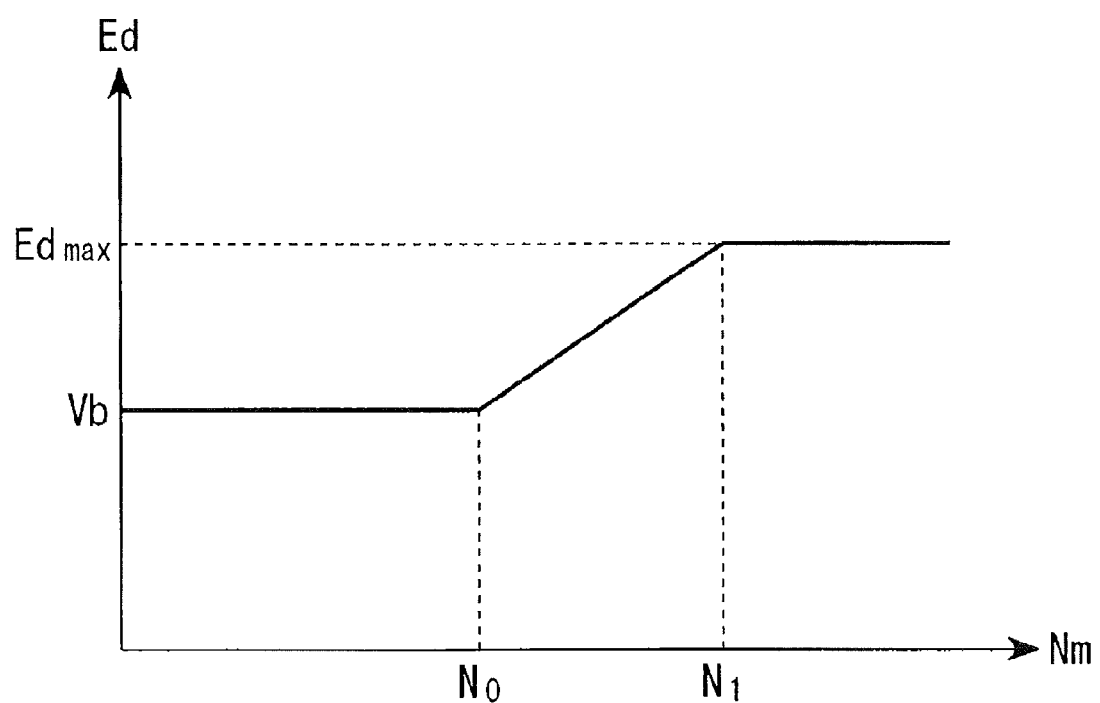
FIG. 16 is a characteristic curve diagram showing a relation between the rotating speed of the motor and a DC voltage of a DC link circuit in the example of the related motor driving system.

In the state of the intermediate speed rotation driving of the AC motor 6, the way of driving becomes similar to that in the example of the related system shown in FIG. 15. However, from the view point of circuit, there is no intervention of a reactor L and, along with this, the DC to DC converter unit 3 is subjected to no PWM driving. This can prevent a copper loss and a core loss in the reactor L and, along with this, can prevent a switching loss and a turn-on loss in the DC to DC converter unit 3.

Next to this, an explanation will be made about the case in which a vehicle runs, for example, at a high speed (80 km/h or more) of running in a highway and the AC motor 6 is driven to rotate in a high speed rotating region with the rotating speed Nm of the AC motor 6 exceeding the specified rotating speed $N_0$ shown in FIG. 4 and becoming not more than $N_1$ larger than the specified rotating speed $N_0$.

Figure 7:
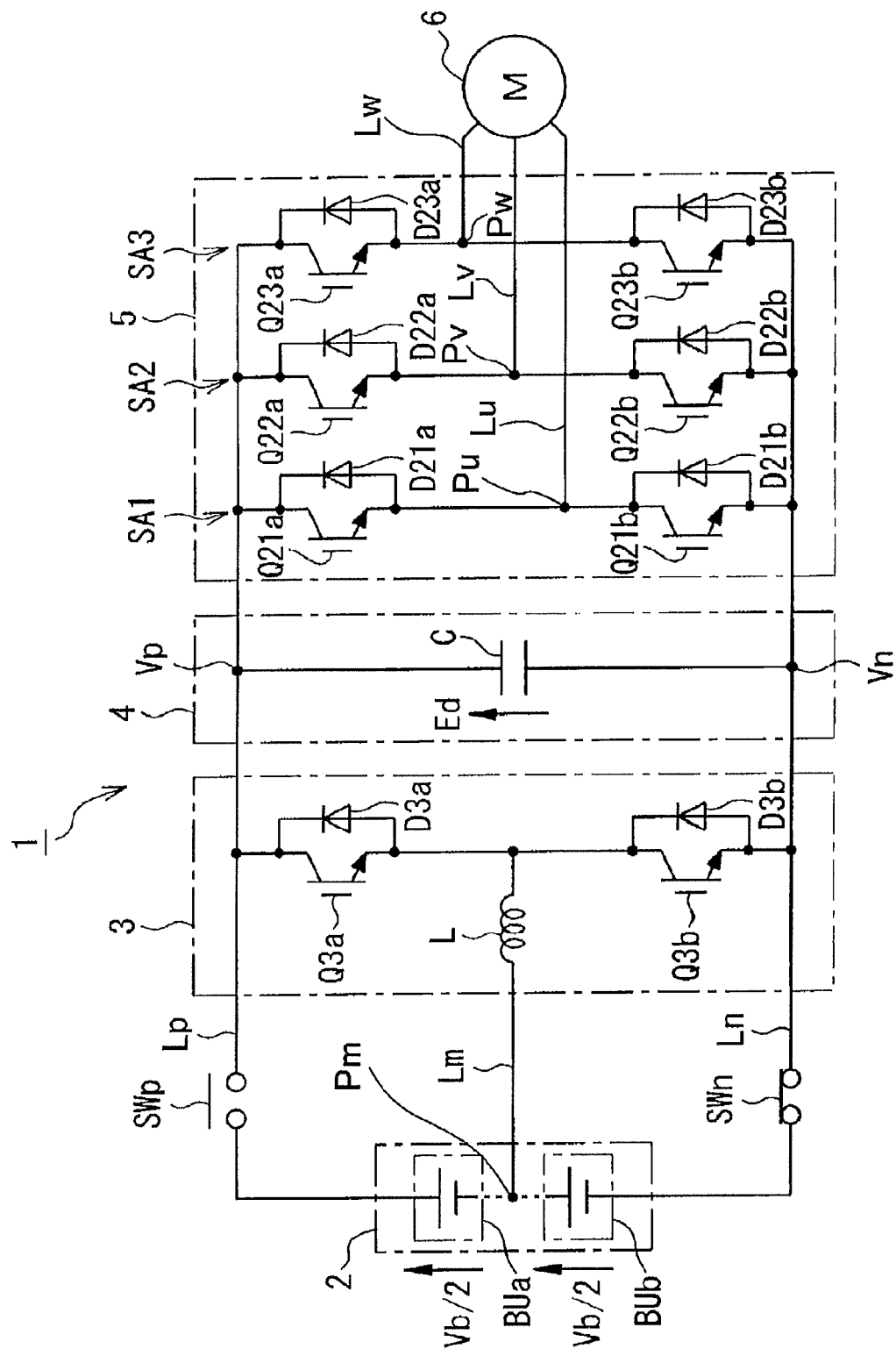
FIG. 7 is a block diagram illustrating a state of operation when the motor is driven in a high speed rotating region in the embodiment of the load driving system according to the invention.

FIG. 7 is a block diagram illustrating a state of operation when the AC motor 6 is driven in a high speed rotating region in the embodiment of the load driving system according to the invention. In the high speed rotating region, as shown in FIG. 7, by making the positive electrode side switching circuit SWp normally in a turned-off state and making the negative electrode side switching circuit SWn normally in a turned-on state, the battery units BUb is chosen. Moreover, the positive electrode side of the battery units BUb is connected to the connection point of the switching devices Q3a and Q3b in the DC to DC converter unit 3 through the intermediate potential line Lm and the reactor L, and the negative electrode side of the battery units BUb is connected to the negative electrode side line Ln through the negative electrode side switching circuit SWn.

In this state, the switching device Q3b in the DC to DC converter unit 3 is subjected to PWM control. At this time, when the rotating speed Nm of the AC motor 6 is the specified rotating speed $N_0$, the duty ratio of the PWM signal supplied to the gate of the switching device Q3b is chosen so that a step-up rate α for the voltage of the battery unit Bub becomes "2". This raises the voltage Vb/2 of the battery unit BUb to the battery voltage Vb. With the raised voltage Vb, the DC link capacitor C in the DC link circuit 4 is charged. This makes the DC voltage Ed across the DC link capacitor C equal to the battery voltage Vb, which is also equal to the DC voltage Ed for providing the intermediate speed rotating region as explained before.

In the step-up operation, by bringing the switching device Q3a into the normally turned-off state and bringing the switching device Q3b into the normally turned-on state in the in the DC to DC converter unit 3, a current flows in the reactor L. From the state, the switching device Q3b is brought into the turned-off state, by which counter electromotive force is produced in the reactor L so as to make a current continuously flow therein. A voltage due to the counter electromotive force charges the DC link capacitor C in the DC link circuit 4 through the diode D3a to thereby carry out the step-up operation.

Thereafter, with the duty ratio of a PWM signal made increased which is supplied to the switching device Q3b, the step-up rate α is gradually increased from "2" to thereby gradually increase the DC voltage outputted from the DC to DC converter unit 3. This gradually increases the rotating speed Nm of the AC motor from the specified rotating speed $N_0$.

By increasing the step-up rate α, the DC voltage Ed of the DC link capacitor C, being charged in the DC link circuit 4 by the DC voltage outputted from the DC to DC converter unit 3, reaches the predetermined maximum voltage $Ed_{MAX}$. Thereafter, the duty ratio of the PWM signal, supplied to the gate of the switching device Q3b, is fixed so that the output voltage of the DC to DC converter unit 3 is kept at the maximum voltage $Ed_{MAX}$ set for the DC voltage Ed across the DC link capacitor C.

In the case of driving the AC motor 6 to rotate in the high speed rotating region, the circuit configuration becomes identical to that in the example of the related system with a difference in that the battery voltage Vb to be an input voltage becomes Vb/2. This increases the loads on the switching device Q3b and the diode D3a and the load on the battery unit BUb at voltage raising becomes heavier compared with the loads in the related system.

Figure 8:
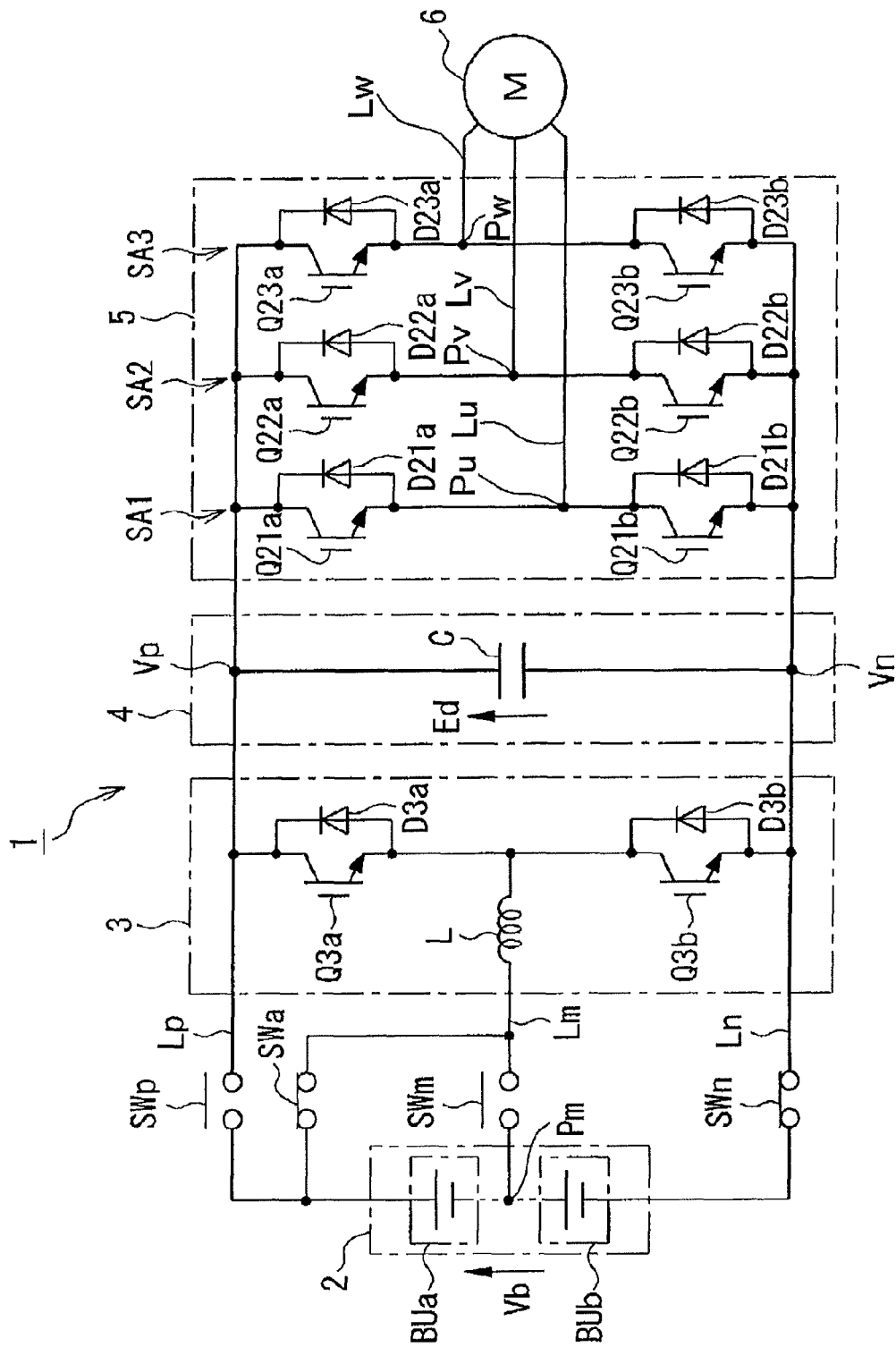
FIG. 8 is a block diagram illustrating a state of operation when the motor is driven in the high speed rotating region in a modification of the embodiment of the load driving system according to the invention.

For resolving the problem of increasing the load on the battery unit BUb, as is shown in FIG. 8, a block diagram illustrating a state of operation when the AC motor 6 is driven in the high speed rotating region in a modification of the embodiment of the load driving system according to the invention, between the intermediate potential line Lm and the intermediate potential point Pm of the battery units BUa and BUb, an intermediate potential switching circuit SWm is inserted that is the same as the positive electrode side switching circuit SWp or the negative electrode side switching circuit SWn. Along with this, between the connection point of the battery unit BUa and the positive electrode side switching circuit SWp and the connection point of the intermediate potential switching circuit SWm and the reactor L, a bypass switching circuit SWa is provided.

According to the configuration, when driving the AC motor 6 to rotate in the high speed rotating region, with the positive electrode side switching circuit SWp and the intermediate potential switching circuit SWm made to be in a normally turned-off state and with the negative electrode side switching circuit SWn and the bypass switching circuit SWa made to be in a normally turned-on state, both of the battery units BUa and BUb are chosen, by which the voltage outputted from the DC power supply 2 is made to be served as the battery voltage Vb.

In this case, the duty ratio of the PWM signal supplied to the gate of the switching device Q3b in the DC to DC converter unit 3 is determined so that the step-up rate α becomes "1" when the rotating speed Nm of the AC motor 6 is the specified rotating speed $N_0$. This can make the DC voltage Ed across the DC link capacitor C equal to the battery voltage Vb when the rotating speed Nm of the AC motor 6 is the specified rotating speed $N_0$.

In this way, according to the configuration shown in FIG. 8, the battery voltage Vb can be supplied to the reactor L in the DC to DC converter unit 3. Therefore, the loads on the battery units BUa and BUb at a step-up operation are equalized to enable the loads on the battery units BUa and BUb and the loads on the switching device Q3b and the diode D3a to be equal to those in the above explained related system shown in FIG. 15.

Figure 9A:
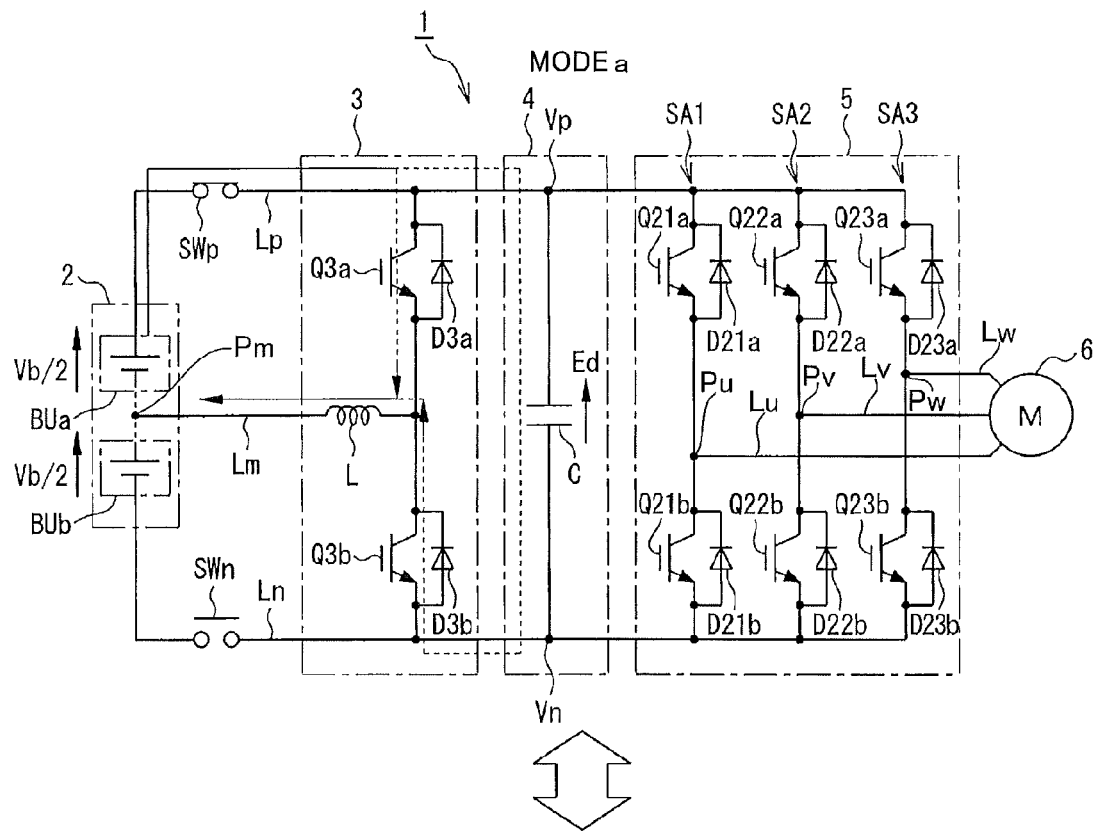
FIG. 9 is a block diagram illustrating a state of operation together with another state of operation when the motor is driven in the high speed rotating region in the embodiment of the load driving system according to the invention.
Figure 9B:
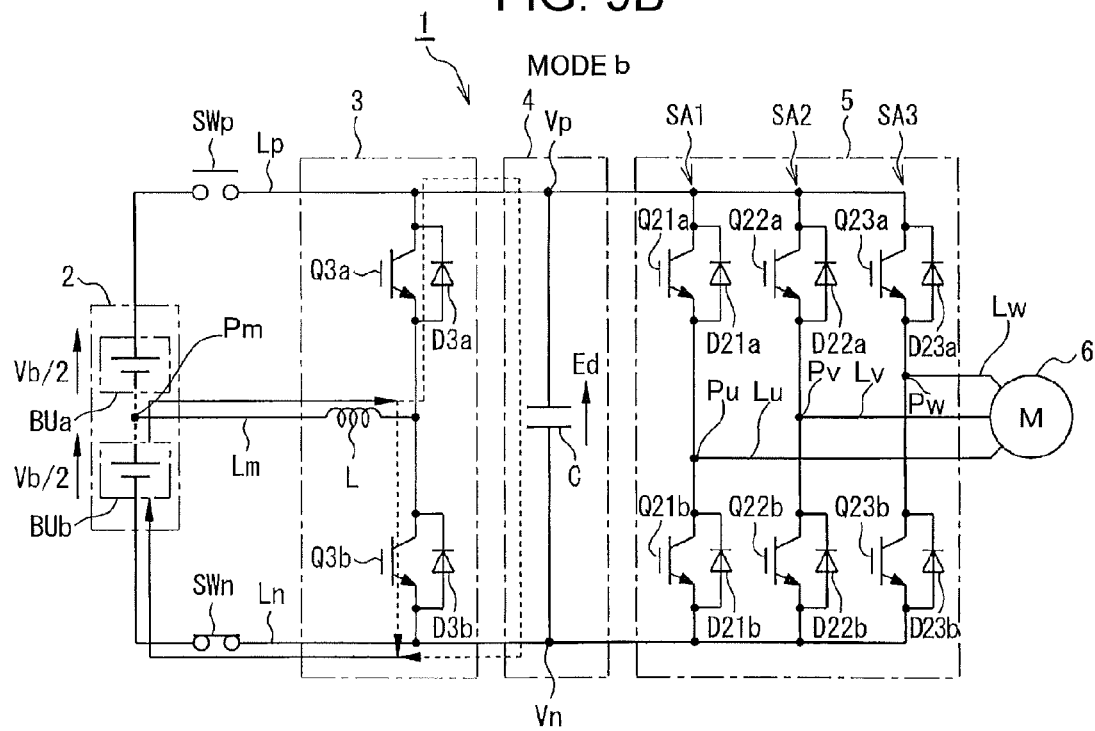

Moreover, FIG. 9 is a block diagram illustrating a state of operation together with another state of operation when the AC motor 6 is driven in the high speed rotating region in the embodiment of the load driving system according to the invention. For reducing an increase in a load on one battery unit BUb in a high speed rotating region of the AC motor 6, the mode "a" of using the battery unit BUa as shown in (a) of FIG. 9 and a mode "b" of using the battery unit BUb as shown in (a) of FIG. 9 can be alternately changed in time sequence in the high speed rotating region. Namely, in the mode "a", with the positive electrode side switching circuit SWp made to be in a normally turned-on state and with the negative electrode side switching circuit SWn made to be in a normally turned-off state, the battery unit BUa is chosen, and with the switching device Q3b in the DC to DC converter unit 3 made to be in the normally turned-off state, a PWM signal is supplied to the gate of the switching device Q3a with a duty ratio according to the rotating speed Nm of the AC motor 6.

Thus, when the switching device Q3a is in a turned-on state, a closed circuit is formed from the positive electrode side of the battery unit BUa to the negative electrode side of the battery unit BUa through the positive electrode side switching circuit SWp, the switching device Q3a and the reactor L to allow a current to flow in the reactor L.

Thereafter, with the switching device Q3b brought to the turned-off state, counter electromotive force is produced in the reactor L so as to make a current continuously flow therein. At this time, the positive electrode side of the battery unit BUa is connected to the positive electrode side of the DC link capacitor C via the positive electrode side switching circuit SWp and the positive electrode side line Lp. While, the negative electrode side of the DC link capacitor C is connected to the negative electrode side of the battery unit BUb through the negative electrode side line Ln, the diode D3b, the reactor L and the intermediate potential line Lm. Thus, with a voltage due to the counter electromotive force that is produced in the reactor L added to the battery voltage Vb/2 of the battery unit BUa, the DC link capacitor in the DC link circuit 4 is charged. As a result, the DC voltage Ed across the DC link capacitor C becomes a voltage to which the battery voltage Vb/2 is raised and the raised DC voltage Ed is supplied to the DC to AC converter unit 5. Hence, in the DC to AC converter unit 5, switching devices Q21a to Q23a and Q21b to Q23b are subjected to PWM controls to drive the AC motor 6 at a high speed.

In the mode "b", a step-up operation becomes like the previously explained step-up operation shown in FIG. 7. By alternately operating the motor driving system 1 in the mode "a" and the mode "b" in time sequence, the loads on the battery units BUa and BUb can be equalized. Along with this, the loads on the switching devices Q3a and Q3b and the diodes D3a and D3b in the DC to DC converter unit 3 can be also equalized. In this way, the loads on the switching devices Q3a and Q3b and the diodes D3a and D3b can be equalized to make it possible to suppress a temperature increase in a semiconductor chip, by which the reliability of the semiconductor chip can be increased.

Incidentally, also in the configuration of the previously explained example of the related motor driving system shown in FIG. 15, in the case of bringing the switching device IGBT2, forming the bilateral step-up chopper unit 101 as a DC to DC converter circuit, into a turned-on state at voltage raising, a current flows in the reactor L. Then, by making the switching device IGBT 2 reversed into a turned-off state, counter electromotive force is produced in the reactor L so that a current continuously flows therein. A voltage due to the counter electromotive force charges the electrolytic capacitor 102 through the diode D1. This brings only the switching device IGBT2 and the diode D1 into an operating state, which causes their loads to become heavier to those on the switching device IGBT1 and the diode D2 that are brought into non-operating states to make the load on semiconductor unequal.

Moreover, when driving the AC motor to rotate with the rotating speed Nm exceeding the specified rotating speed $N_1$, like in the previously explained example of the related system, the control of the switching devices Q21a to Q23a and Q21b to Q23b is made shifted from the PWM control so as to carry out one pulse control or a field weakening control to thereby equalize their loads.

Furthermore, at a regenerative operation in which the AC motor 6 becomes in a state of being operated as a generator with a vehicle brought into a breaking state or into a state of running downhill, generated power is supplied from the DC to AC converter unit 5 to the DC to DC converter unit 3, where the voltage of the power is lowered to supply a charging current to the battery units BUa and BUb.

In the previously described embodiment, the explanation was made about the case in which the AC motor 6 is driven in the intermediate speed rotating region with the DC voltage Ed across the DC link capacitor C in the DC link circuit 4 set to be equal to the battery voltage Vb regardless of the rotating speed of the AC motor 6. The invention, however, is not limited to the configuration in the above case, but the circuit configuration shown in FIG. 8 for driving the AC motor 6 in the high speed rotating region can be applied to the driving in the intermediate speed rotating region, for example. In this case, with the switching circuits SWp and SWa being normally turned-off and with the switching circuit SWn and SWm being normally turned-on in the intermediate speed rotating region, the battery unit BUb is chosen to gradually increase the output voltage of the DC to DC converter unit 3 from Vb/2. This gradually increases the DC voltage Ed across the DC link capacitor C from Vb/2 according to an increase in the rotating speed Nm as shown by a broken line in FIG. 4. When the rotating speed Nm reaches the specified rotating speed $N_0$, the switching circuit SWm is switched to the normally turned-off state and, along with this, the switching circuit SWa is switched to be in the normally turned-on state to switch the state of the battery voltage Vb to a voltage raising state.

Figure 10A:
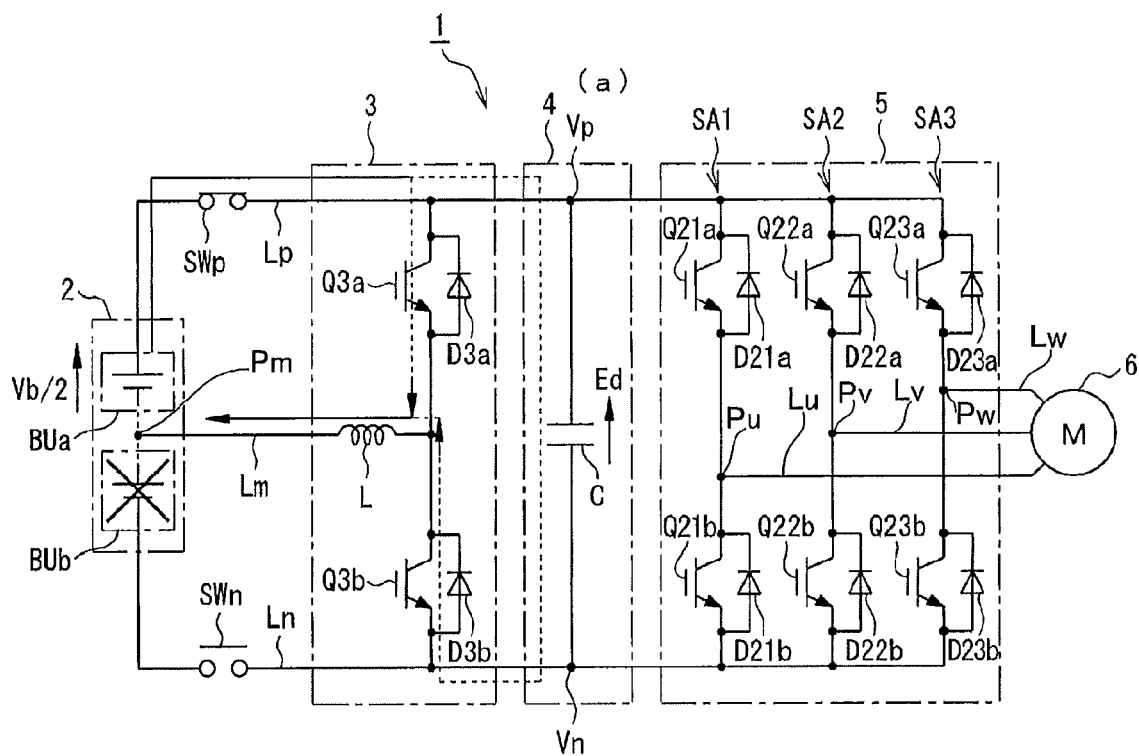
FIG. 10 is a block diagram illustrating states of operations when a failure occurs in one of the battery units in the DC power supply in the embodiment of the load driving system according to the invention with (a) showing the case when a failure of the battery unit BUb occurs and (b) showing the case when a failure of the battery unit BUa occurs.
Figure 10B:
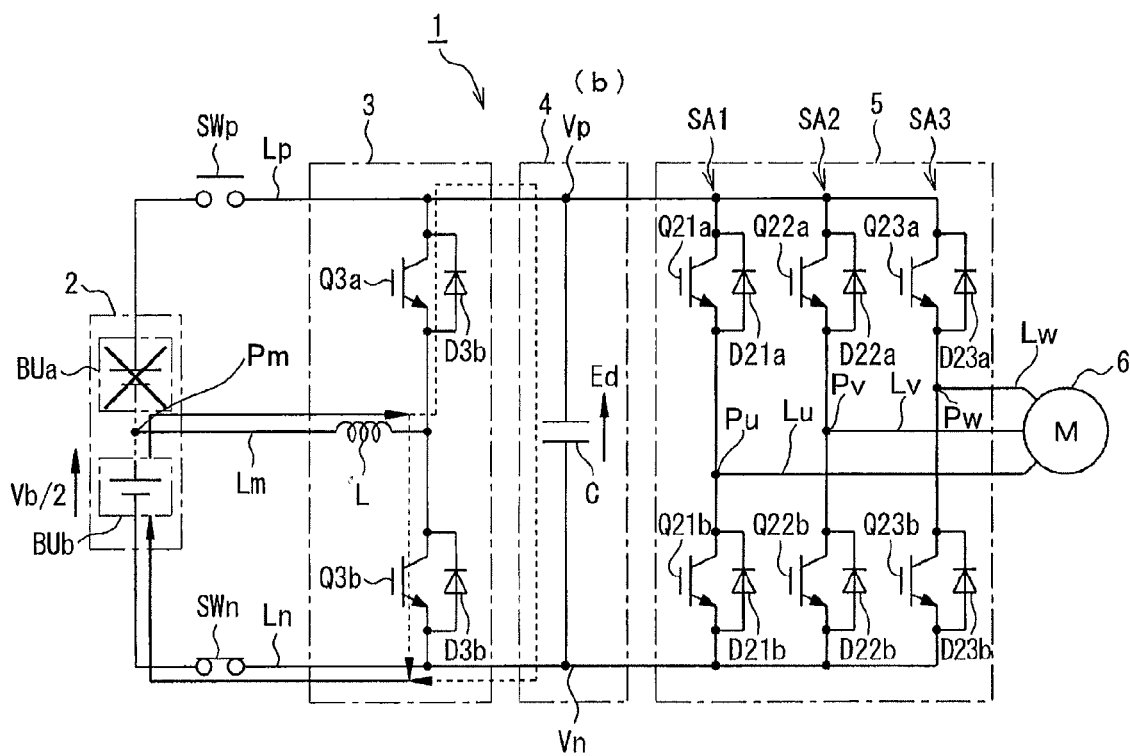

Furthermore, FIG. 10 is a block diagram illustrating states of operations when a failure occurs in one of the battery units in the DC power supply 2 in the embodiment of the load driving system according to the invention. When a failure occurs in the battery unit BUb, as shown in (a) of FIG. 10, the positive electrode side switching circuit SWp is made to be in the normally turned-on state and the negative electrode side switching circuit SWn is made to be in the normally turned-off state. This enables the system to have the same configuration as that in the mode "a" previously shown in (a) of FIG. 9, which can make the driving control of the AC motor 6 continue in a normal condition.

Conversely, when a failure occurs in the battery unit BUa, as shown in (b) of FIG. 10, the positive electrode side switching circuit SWp is made to be in the normally turned-off state and the negative electrode side switching circuit SWn is made to be in the normally turned-on state. This enables the system to have the same configuration as that in the mode "b" previously shown in (b) of FIG. 9, which can make the driving control of the AC motor 6 continue in a normal condition. In this way, even in the case in which a failure occurs in one of the battery units BUa and BUb, a continuation of a normal operation of the AC motor becomes possible to enable improvement in reliability as a vehicle.

Figure 11:
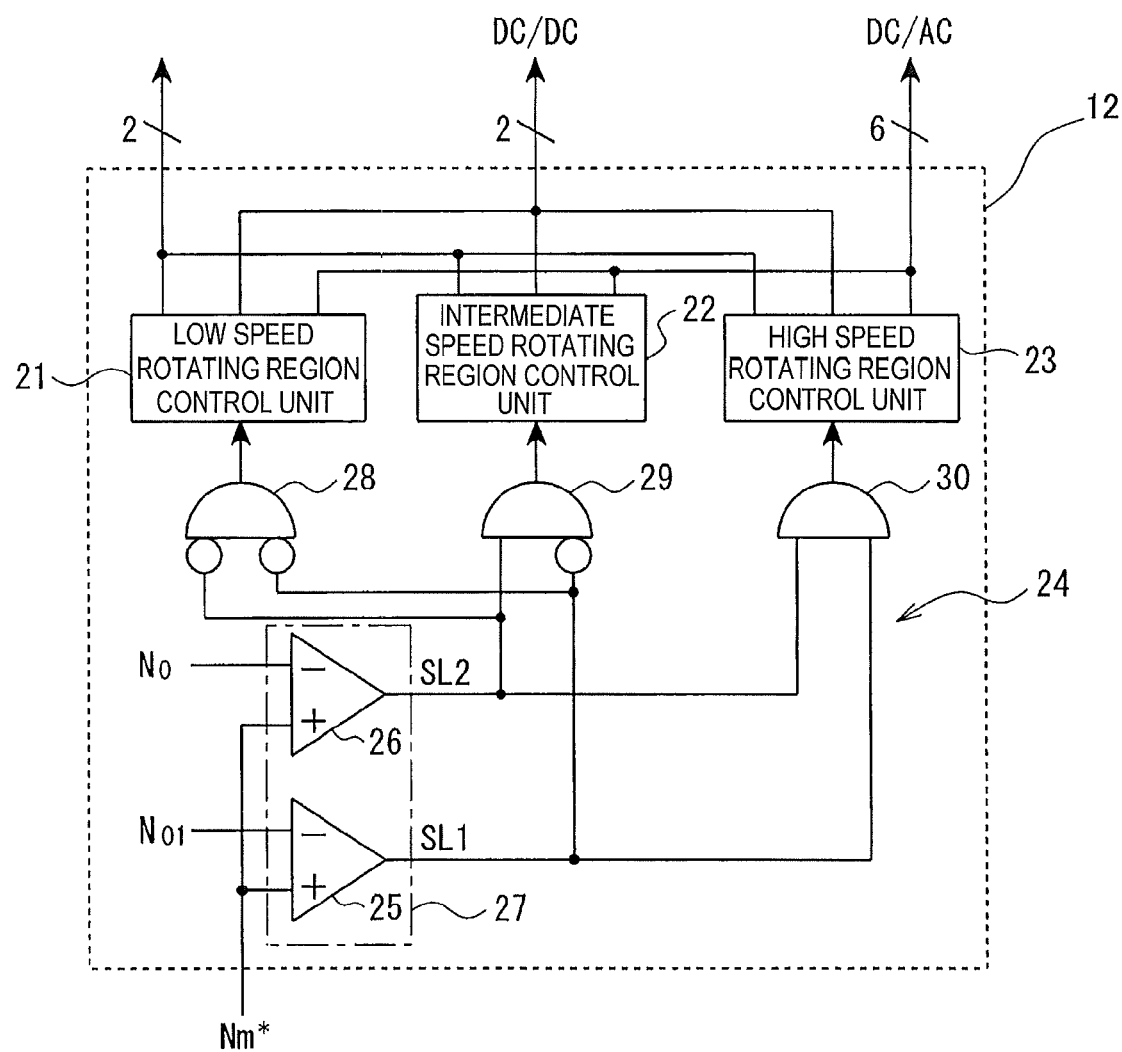
FIG. 11 is a block diagram showing a configuration of a control unit for driving the motor control system in a low speed rotating region, an intermediate speed rotating region and a high speed rotating region.

As was explained in the foregoing, for controlling the positive electrode side switching circuit SWp, the negative electrode side switching circuit SWn, the DC to DC converter unit 3 and the DC to AC converter unit 5 according to the rotating speed region of the rotating speed Nm of the AC motor 6, the configuration of the control unit 12 in the control system 11 shown in FIG. 3 is provided as shown in FIG. 11.

Namely, in the control unit 12, there are provided a low speed rotating region control unit 21, an intermediate speed rotating region control unit 22 and a high speed rotating region control unit 23, and a selector section 24 for choosing the low speed rotating region control unit 21, the intermediate speed rotating region control unit 22 or the high speed rotating region control unit 23. Here, in the low speed rotating region control unit 21, as shown previously in (a) and (b) in FIG. 5, on-off controls of the positive electrode side switching circuit SWp and the negative electrode side switching circuit SWn are carried out, the switching devices Q3a and Q3b in the DC to DC converter unit 3 are brought into turned-off states, and further, PWM controls of the switching devices in the DC to AC converter unit 5 are carried out.

The intermediate speed rotating region control unit 22, as previously shown in FIG. 6, controls both of the positive electrode side switching circuit SWp and the negative electrode side switching circuit SWn to be in turned-on states, controls both of the switching devices Q3a and Q3b in the DC to DC converter unit 3 to be in turned-off states and further carries out PWM controls of the switching devices in the DC to AC converter unit 5. Here, as the intermediate speed rotating region control unit 22, on-off controls of the switching circuits SWp, SWn, SWm and SWa in FIG. 8 can be carried out.

The high speed rotating region control unit 23, as shown in FIG. 7, controls either one of the positive electrode side switching circuit SWp or the negative electrode side switching circuit SWn to be in a turned-on state and controls the other one to be in a turned-off state. The control unit 23 also carries out a PWM control of either one of the switching devices Q3a or Q3b in the DC to DC converter unit 3 which one is connected to the turned-on switching circuit, by which a step-up control is carried out. The control unit 23 further carries out PWM controls of the switching devices in the DC to AC converter unit 5. With the high speed rotating region control unit 23, the step-up control can be carried out so that the mode "a" and the mode "b" are alternately carried out in time sequence as shown in (a) and (b) of FIG. 9.

Moreover, the selector section 24 is provided with a window comparator 27 having two comparators 25 and 26. To the non-inverting input side of each of the comparators 25 and 26, a rotating speed instruction value Nm* is inputted. To the inverting input side of each of the comparators 25 and 26, values of the specified rotating speeds $N_{01}$ and $N_0$ are inputted, respectively. Therefore, the comparator 25 outputs a selection signal SL1 which becomes the logical value "0" when the rotating speed instruction value Nm* is smaller than the value of the specified rotating speed $N_{01}$ and becomes the logical value "1" when the rotating speed instruction value Nm* is larger than the value of the specified rotating speed $N_{01}$.

In addition, the comparator 25 outputs a selection signal SL2 which becomes the logical value "0" when the rotating speed instruction value Nm* is smaller than the value of the specified rotating speed $N_0$ and becomes the logical value "1" when the rotating speed instruction value Nm* is larger than the value of the specified rotating speed $N_0$. The selection signals SL1 and SL2 are supplied to an AND circuit 28 with both of input sides for the signals SL1 and SL2 provided as inverting input sides, to an AND circuit 29 with the input side for the signal SL1 provided as an inverting input side and to an AND circuit 30.

Furthermore, the output of the AND circuit 28 is supplied to the low speed rotating region control unit 21, the output of the AND circuit 29 is supplied to the intermediate speed rotating region control unit 22 and the output of the AND circuit 30 is supplied to the high speed rotating region control unit 23. Thus, a configuration is provided so that each of the low speed rotating region control unit 21, the intermediate speed rotating region control unit 22 and the high speed rotating region control unit 23 is brought to an operation state when a signal inputted thereto from a corresponding AND circuit has a logical value "1".

Therefore, when the rotating speed instruction value Nm* is smaller than the value of the specified rotating speed $N_{01}$, the values of both of the selection signals SL1 and SL2 outputted from the comparators 25 and 26, respectively, become the logical value "0". This makes only the AND circuit 28 output the logical value "1" to bring only the low speed rotating region control unit 23 into an operating state, by which the AC motor 6 is driven at a low rotating speed.

Moreover, when the rotating speed instruction value Nm* is larger than the value of the specified rotating speed $N_{01}$ and smaller than the value of the specified rotating speed $N_0$, the value of the selection signal SL1 outputted from the comparators 25 becomes the logical value "1" and the value of the selection signal SL2 outputted from the comparators 26 becomes the logical value "0". This makes only the AND circuit 29 output the logical value "1" to bring only the intermediate speed rotating region control unit 22 into an operating state, by which the AC motor is driven at an intermediate rotating speed.

Furthermore, when the rotating speed instruction value Nm* is larger than the value of the specified rotating speed $N_0$, the value of the selection signal SL1 outputted from the comparators 25 becomes the logical value "1" and the value of the selection signal SL2 outputted from the comparators 26 also becomes the logical value "1". This makes only the AND circuit 30 output the logical value "1" to bring only the high speed rotating region control unit 23 into an operating state, by which the AC motor is driven at a high rotating speed.

Figure 12:
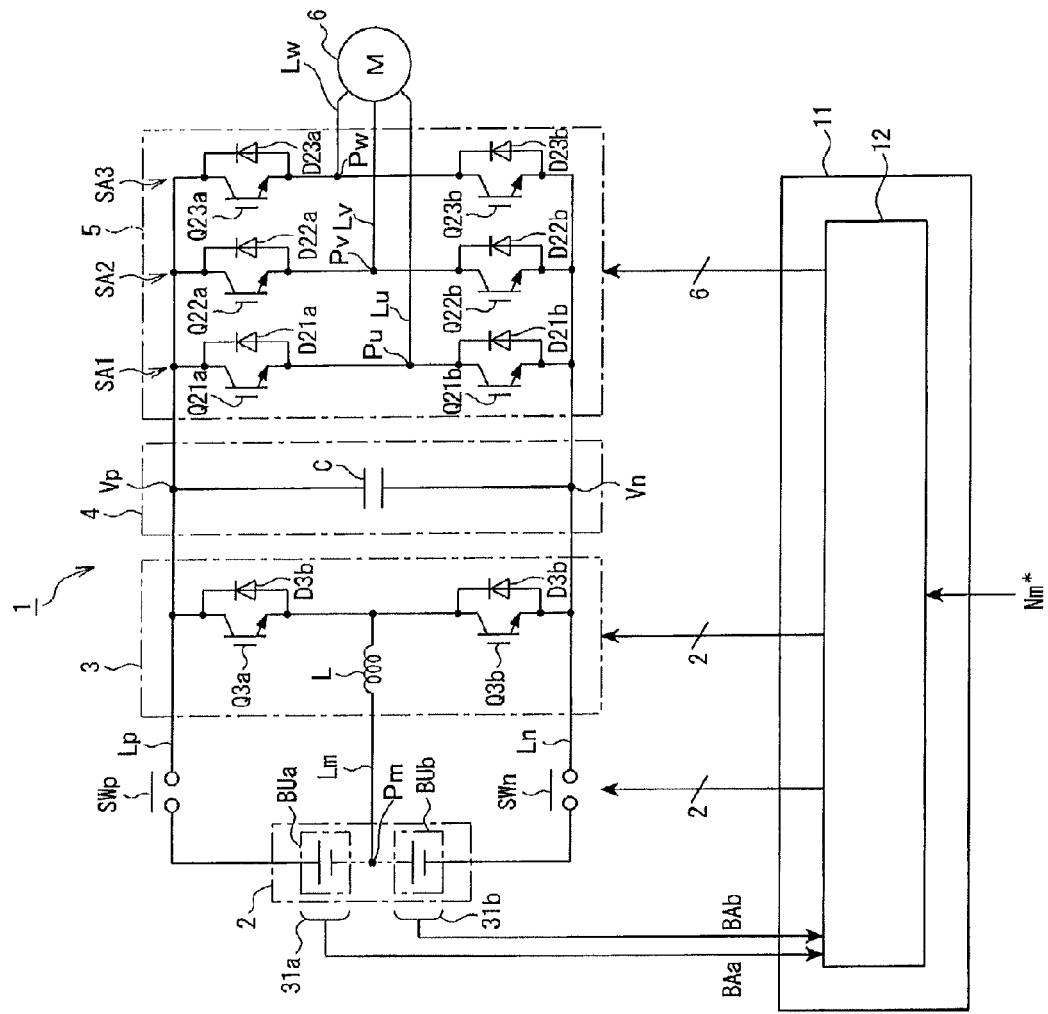
FIG. 12 is a block diagram showing a load driving system with a control system in which measures against failures of battery units are taken into consideration.

In addition, in the case of providing the control unit 12 of the control system 11 with measures against failures of the battery units BUa and BUb also taken into consideration, as is given in FIG. 12, a block diagram showing the motor driving system 1 with the control system 11 in which measures against failures of the battery units BUa and BUb are taken into consideration, battery failure detecting units 31a and 31b are provided which detect the terminal voltages Va and Vb of the battery units BUa and BUb, respectively, to detect presence or absence of failures. Battery failure detection signals BAa and BAb, outputted when failures of the battery units BUa and BUb are detected by the battery failure detecting units 31a and 31b, are supplied, respectively, to the control unit 12. In the control unit 12, as is given in FIG. 13, a block diagram showing a specific configuration of the control unit 12 of the control system 11 in FIG. 12, there are provided a control unit at unit BUb failure 32 that carries out control when a failure of the battery unit BUb occurs, a control unit at unit BUa failure 33 that carries out control when a failure of the battery unit BUb occurs and a control unit at normal operation 34 that carries out control when the battery units BUa and BUb are normal with the same configuration as that of the control unit 12 shown in previously explained FIG. 11.

Here, the control unit at unit BUb failure 32, as is shown in previously explained (a) of FIG. 10, chooses the battery unit BUa with the positive electrode side switching circuit SWp made to be in the normally turned-on state and the negative electrode side switching circuit SWn made to be in the normally turned-off state. Besides, the control unit at unit BUb failure 32 carries out PWM control of the switching device Q3a in the DC to DC converter unit 3 and further carries out PWM control of the switching devices in the DC to AC converter unit 5. In addition, the control unit at unit BUa failure 33, as is shown in previously explained (b) of FIG. 10, chooses the battery unit BUb with the positive electrode side switching circuit SWp made to be in the normally turned-off state and the negative electrode side switching circuit SWn made to be in the normally turned-on state. Besides, the control unit at unit BUb failure 32 carries out PWM control of the switching device Q3b in the DC to DC converter unit 3 and further carries out PWM control of the switching devices in the DC to AC converter unit 5.

When the battery failure detection signals BAa and BAb are supplied to a selector switch circuit 35 with the value of each of the battery failure detection signals BAa and BAb being a logical value "0", the control unit at normal operation 34 is chosen, by which the switch circuits SWp and SWn, the DC to DC converter unit 3 and the DC to AC converter unit 5 are controlled. Moreover, when the value of the battery failure detection signal BAa is a logical value "0" and the value of the battery failure detection signal BAb is a logical value "1", the control unit at unit BUb failure 32 is chosen by the selector switch circuit 35, by which the switch circuits SWp and SWn, the DC to DC converter unit 3 and the DC to AC converter unit 5 are controlled. Furthermore, when the value of the battery failure detection signal BAa is a logical value "1" and the value of the battery failure detection signal BAb is a logical value "0", the control unit at unit BUa failure 33 is chosen by the selector switch circuit 35, by which the switch circuits SWp and SWn, the DC to DC converter unit 3 and the DC to AC converter unit 5 are controlled.

Figure 13:
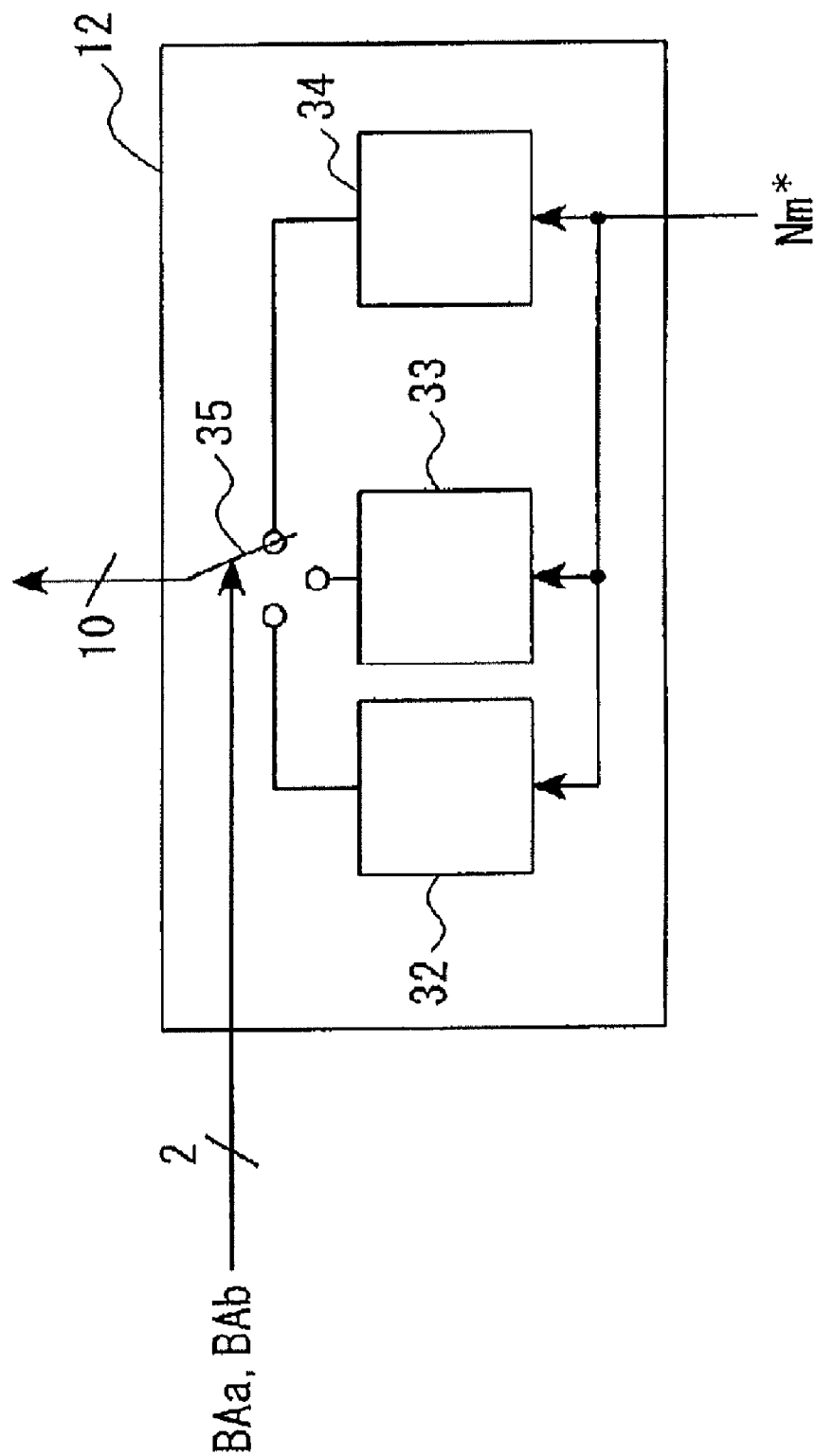
FIG. 13 is a block diagram showing a specific configuration of a control unit of the control system given in FIG. 12.

In this way, by making the control unit 12 in the control system 11 have a configuration shown in FIG. 12 and FIG. 13, when both of the battery units BUa and BUb in the DC power supply are normal, the rotating speed control of the AC motor 6 is carried out according to the rotating speed instruction value Nm*. While, when either one of the battery units BUa or BUb causes failure, a normal battery unit is used to enable continuation of the normal rotating speed control of the AC motor 6.

Figure 14:
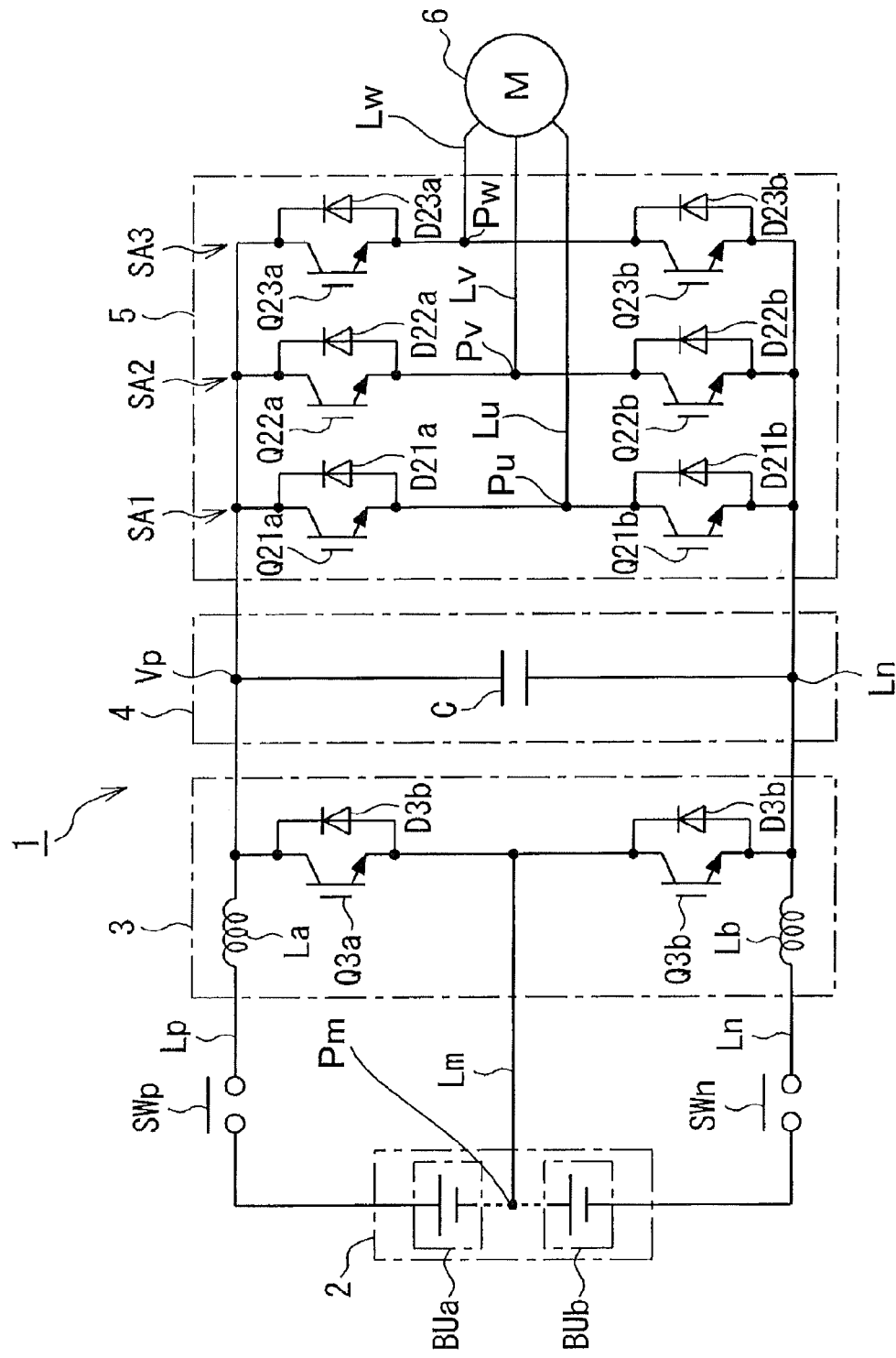
FIG. 14 is a block diagram showing another modification of the embodiment of the load driving system shown in FIG. 1.

In the embodiment, an explanation was made about the case in which the intermediate potential point Pm between the battery units BUa and BUb is connected to the point between the switching devices Q3a and Q3b forming the DC to DC converter unit 3 through the reactor L. The configuration of the system according to the invention, however, is not limited to the above described configuration but can be provided to have, for example, a configuration as is given in FIG. 14, a block diagram showing another modification of the embodiment of the load driving system shown in FIG. 1. In the configuration, the reactor L is divided into a reactor La and a reactor Lb each having an inductance one-half the inductance of the reactor L. The divided reactor La is inserted in the positive electrode side line Lp between the positive electrode side switching circuit SWp and the collector of the switching device Q3a in the DC to DC converter unit 3. While, the divided reactor Lb is inserted in the negative electrode side line Ln between the negative electrode side switching circuit SWn and the emitter of the switching device Q3b in the DC to DC converter unit 3. Also in this case, the same operation and working effect as those in the previously explained embodiment can be obtained.

In the embodiment, an explanation was made about the case in which the battery units BUa and BUb are used as the DC power supply 2. The invention, however, is not limited to this, but the DC power supply 2 can be formed of two DC power supply units of other kind such as two fuel cell units or two solar cell units. Furthermore, the DC power supply 2 can be formed by connecting two units of dissimilar combination of DC power supply units of different kinds such as a battery unit, a fuel cell unit and a solar cell unit.

Furthermore, in the embodiment, an explanation was made about the case of using an IGBT as a switching device. The invention, however, is not limited to this, but any switching device such as a power MOSFET, a gate turn-off thyristor (GTO), a static induction transistor (SIT) can be used according to consumed power.

In addition, in the embodiment, explanations were made about the case in which the invention was applied to an electric vehicle. The invention, however, is not limited to this but can be also applied to a load driving system that drives an AC load other than an AC motor of an electric vehicle with the DC power supply 2.

While the present invention has been particularly shown and described with reference to the preferred embodiment thereof, it will be understood by those skilled in the art that the foregoing and other changes in form and details can be made therein without departing from the spirit and scope of the present invention.

What is claimed is:

1. A load driving system driving an AC motor with the use of a DC power supply, the system comprising:
   a pair of DC power supply units connected together in series at a connection point to form the DC power supply, the connection point being at an intermediate potential between a positive potential and a negative potential;
   a positive electrode side line with a first end thereof connected to a positive electrode side of the DC power supply through a positive electrode side switching circuit;
   a negative electrode side line with a first end thereof connected to a negative electrode side of the DC power supply through a negative electrode side switching circuit;
   an intermediate potential line with a first end thereof connected to the intermediate potential point;
   a DC to DC converter unit having at least two switching devices connected in series between the positive electrode side line and the negative electrode side line;
   a DC link circuit having a DC link capacitor connected in parallel with the DC to DC converter unit and between the positive electrode side line and the negative electrode side line; and
   a DC to AC converter unit connected to a second end of the positive electrode side line and a second end of the negative electrode side line and in parallel with the DC link capacitor in the DC link circuit to convert DC power in the DC link circuit to AC power to supply the AC power to the AC motor,
   wherein the second end of the intermediate potential line is connected to the connection point, and
   a reactor is provided in at least either the intermediate potential line or each of the positive electrode side line and the negative electrode side line.

2. The load driving system as claimed in claim 1 wherein one of the positive electrode side switching circuit and the negative electrode side switching circuit is controlled to be in a normally turned-off state and the other one is controlled to be in a normally turned-on state to form a low power supplying unit for supplying a voltage of one-half of the voltage of the DC power supply to the DC link circuit.

3. The load driving system as claimed in claim 2 wherein a first control mode, in which the positive electrode side switching circuit is controlled to be in a turned-on state and the negative electrode side switching circuit is controlled to be in a turned-off state, and a second control mode, in which the positive electrode side switching circuit is controlled to be in a turned-off state and the negative electrode side switching circuit is controlled to be in a turned-on state, are made to be alternately repeated in time sequence.

4. The load driving system as claimed in claim 1 wherein both of the positive electrode side switching circuit and the negative electrode side switching circuit are controlled to be in normally turned-on states to form an intermediate power supplying unit for supplying the voltage of the DC power supply to the DC link circuit.

5. The load driving system as claimed in claim 1 wherein one of the positive electrode side switching circuit and the negative electrode side switching circuit is controlled to be in a normally turned-off state, the other one is controlled to be in a turned-on state and the switching devices in the DC to DC converter unit are subjected to on-off control to form a high power supplying unit for supplying a voltage, to which a voltage of one-half of the voltage of the DC power supply is raised by the reactor, to the DC link circuit.

6. The load driving system as claimed in claim 5 wherein a first control mode, in which the positive electrode side switching circuit is controlled to be in a turned-on state and the negative electrode side switching circuit is controlled to be in a turned-off state, and a second control mode, in which the positive electrode side switching circuit is controlled to be in a turned-off state and the negative electrode side switching circuit is controlled to be in a turned-on state, are made to be alternately repeated in time sequence.

7. The load driving system as claimed in claim 1 wherein when one of a pair of the DC power supply units becomes abnormal, one of the positive electrode side switching circuit and the negative electrode side switching circuit that is connected to an abnormal DC power supply unit is controlled to be in a normally turned-off state and the other switching circuit that is connected to a normal DC power supply unit is controlled to be in a normally turned-on state and, along with this, a switching device in the DC to DC converter unit, which device is connected to the normal DC power supply unit through the switching circuit controlled to be in the normally turned-on state, is subjected to on-off control to supply DC power to the DC link circuit.

8. An electric vehicle provided with a load driving system according to claim 1 as a motor driving system configured to drive driving wheels of a vehicle.

* * * * *